Figure 1:
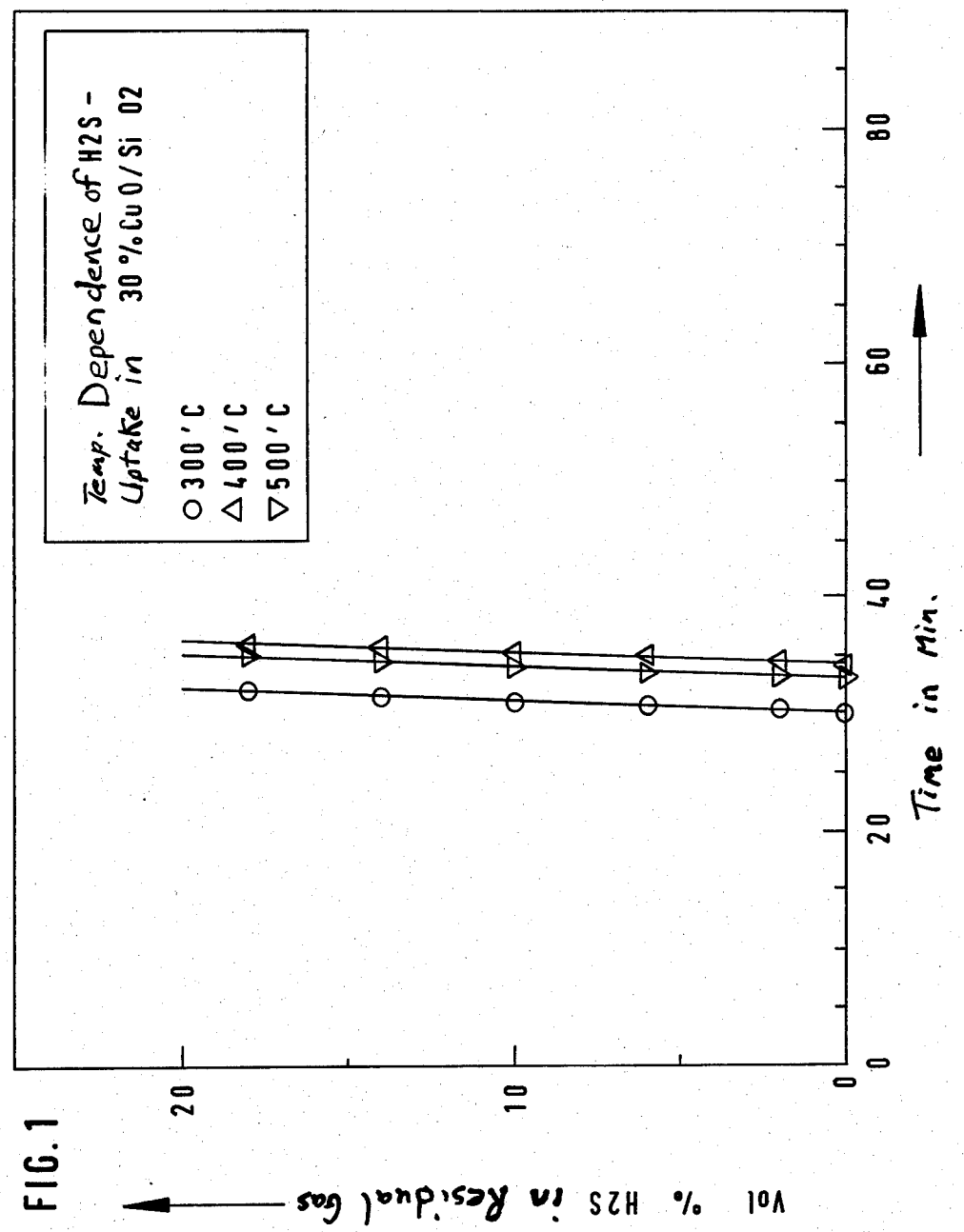

United States Patent [19]

van der Wal et al.

[11] Patent Number: 4,478,800

[45] Date of Patent: Oct. 23, 1984

[54] PROCESS FOR REMOVAL OF SULFUR COMPOUNDS FROM GASES

[75] Inventors: Willem J. J. van der Wal, Utrecht; John W. Geus, Bilthoven, both of Netherlands

[73] Assignee: VEG Gasinstituut N.V., Apeldoorn, Netherlands

[21] Appl. No.: 404,929

[22] Filed: Aug. 4, 1982

[30] Foreign Application Priority Data

Aug. 7, 1981 [DE] Fed. Rep. of Germany ....... 3131257

[51] Int. Cl.³ ............................................. B01D 53/34
[52] U.S. Cl. .................................... 423/230; 423/231; 423/244
[58] Field of Search ........... 423/210, 230, 231, 244 R, 423/245

[56] References Cited

U.S. PATENT DOCUMENTS

| | | |
|---|---|---|
| 2,777,823 | 1/1957 | Rottig . |
| 3,404,099 | 10/1968 | Steinmetz . |
| 3,579,293 | 5/1971 | Shulz et al. ........................ 423/231 |
| 3,840,479 | 10/1968 | Geus . |
| 4,088,736 | 5/1978 | Courty et al. ....................... 423/230 |
| 4,155,990 | 5/1979 | Kimura et al. ..................... 423/574 R |
| 4,190,560 | 2/1980 | Geus et al. . |

FOREIGN PATENT DOCUMENTS

| | | |
|---|---|---|
| 2144567 | 3/1972 | Fed. Rep. of Germany . |
| 1767202 | 5/1975 | Fed. Rep. of Germany . |
| 2614307 | 10/1977 | Fed. Rep. of Germany ...... 423/230 |
| 1220105 | 1/1971 | United Kingdom . |
| 1351786 | 5/1974 | United Kingdom . |

OTHER PUBLICATIONS

Langenbeck et al., "Uber einen hochaktiven Nickel-Hydmerkontaki", Naturwissenschaften, 41 (1954), p. 332.

Langenbeck et al., "Uber Mischoxalat-Kontakte", Zeitschr. anorg. allgem. Chem., 281 (1955), pp. 90–98.

Primary Examiner—Earl C. Thomas
Attorney, Agent, or Firm—Mandeville and Schweitzer

[57] ABSTRACT

Process for removal of sulfur compounds from gases by passing the gases over an absorption mass which, on an inert support having a specific surface area of more than 10 $m^2$ per g, contains metal oxides which react with hydrogen sulfide to give metal-sulfur compounds and at least 20% by weight of which metal oxides are present in finely divided form with a particle size of less than 40 nm. The gases are passed at a temperature of 5° to 800° C. over the support loaded with metal oxide, and the resultant support loaded with metal-sulfur compounds is regenerated by passing gases containing oxidizing agents over it.

20 Claims, 13 Drawing Figures

PROCESS FOR REMOVAL OF SULFUR COMPOUNDS FROM GASES

The invention relates to a process for removal of sulfur compounds from gases by passing the gases over metal oxides which react with sulfur compounds to give metal-sulfur compounds and oxidation of the metal-sulfur compounds.

Before 1940 hydrogen sulfide was removed from coal gas, an important industrial reducing gas, by reaction with moist iron oxide at temperatures below about 100° C. When the sulfur uptake had reduced the reactivity of the oxide, the absorption mass was regenerated by treatment with air. The reaction with oxygen gradually converted the iron sulfide formed to iron oxide and elemental sulfur. The accelerate the reaction, the absorption mass was removed from the reactor and divided onto a large area. This is an elaborate process. The regeneration at low temperatures took days. Oxidation at elevated temperatures led to inactive iron oxide and was therefore not practicable. Due to the slow transport of the hydrogen sulfide through the moist iron oxide during the absorption, the extent of conversion of iron oxide to iron sulfide was low. To increase the available surface area, the absorption mass had been mixed with sawdust.

To obtain a higher uptake of sulfur, a small amount of oxygen was added to the coal gas. The iron oxide then acted as a catalyst which effected a reaction between the hydrogen sulfide and oxygen at low temperatures. The elemental sulfur formed remained in the iron oxide and reduced the catalytic activity. Since it was difficult to extract the deposited sulfur from the catalyst mass, the deactivated catalyst was as a rule discarded. The frequent renewal of the catalyst was of course industrially disadvantageous.

Because of these disadvantages, the removal of hydrogen sulfide by absorption in liquid phase was carried out in a continuous manner. Hydrogen sulfide is absorbed in organic liquids such as methanol or alkanolamines. Although this process offers advantages over those involving iron oxide, it has some disadvantages. Coal gases are as a rule subjected to subsequent catalytic processes. An important example of this is methanation, and the methanation catalysts are very sensitive to poisoning by sulfur. The sulfur content of the purified gas must therefore be extremely low. Another example is the reaction of CO with $H_2$ to give methanol. There are many liquids with which it is difficult to obtain the extremely low sulfur content required. Moreover, carbon dioxide is as a rule absorbed at the same time and in a much larger amount than hydrogen sulfide. The separation and conversion of hydrogen sulfide which is strongly diluted with carbon dioxide is difficult. Large volumes of liquids must be circulated, and the loss of organic solvents which are as a rule expensive must be prevented, which leads to extensive equipment-related provisions. Finally, the conversion of separated-off hydrogen sulfide in the Claus process is not easy. In the Claus process, hydrogen sulfide is oxidised to give elemental sulfur and water. A problem associated with this process is environmental pollution by the tail gases of the Claus process.

To solve these problems, it is known from German Offenlegungsschrift No. 2,614,307 to oxidise hydrogen sulfide contained in combustible gases to elemental sulfur at temperatures between 121° and 232° C. Oxygen or sulfur dioxide is added as an oxidising agent to gases to be treated. Due to the unfavourable shift of the equilibrium $$2H_2S + O_2 \rightleftarrows 2S + H_2O$$

the oxidation of a large fraction of the hydrogen sulfide can only be achieved at the abovementioned temperatures of 121° to 232° C. However, at these temperatures it is difficult to avoid deactivation of the catalyst by deposition of condensing sulfur. The vapour pressure must therefore be kept very low. For this reason, the gas mixtures containing low amounts of hydrogen sulfide can be processed only at relatively low pressures. Since, as already explained above, iron oxide is unsuitable as a catalyst at 121° to 232° C., reduced oxides and/or sulfides of metals of the VA and the VIA groups of the periodic system are used according to German Offenlegungsschrift No. 2,614,307 on a non-alkaline, porous, refractory oxide. The oxidation produces elemental sulfur which is separated from the gas stream. Vanadium pentoxide in an amount of 2 to 20% by weight on alumina or on a molecular sieve is mentioned as a preferable catalyst.

German Offenlegungsschrift No. 2,614,307 mainly relates to the removal of hydrogen sulfide from tail gases of the Claus process and from acidic natural gases. However, the process is not readily applicable to gases which contain a high fraction of carbon monoxide. Van Dillen (doctoral thesis, Utrecht, 1977) has shown that reduced vanadium pentoxide strongly accelerates the reaction of carbon monoxide to carbon:

$$2CO \rightarrow C + CO_2$$

Carbon is therefore deposited on the vanadium oxide and the catalyst is deactivated. Van Dillen has shown that vanadium pentoxide precipitated on silica also enters into this reaction. Analogous difficulties arise with other oxides mentioned in German Offenlegungsschrift No. 2,614,307.

The industrially most important processes for removal of hydrogen sulfide are the abovementioned absorption processes with solvents, wherein cooling down to 80° C. or below must take place. However, such low temperatures are disadvantageous in particular in the processing of coal gas. Coal gasification is carried out at high temperatures of 800° to 1500° C. To remove hydrogen sulfide by the known process from the crude gas, cooling to very low temperatures must take place. The subsequent industrial catalytic processes in turn are carried out at high temperatures of at least about 200° C., so that, consequently, the gases must be heated up again after the desulfuration step. The use of the high heat content of the crude gases requires extensive equipment. Before the purification of the crude gas in accordance with the process of the state of the art, steam added for the coal gasification process had, in addition, to be removed virtually completely. This removal of steam is also a disadvantage for the subsequent catalytic processes, for example the carbon monoxide shift conversion, since considerable amounts of steam are required for this purpose.

As explained above, iron oxide cannot be employed at elevated temperatures, since it is rapidly deactivated. The deactivation of iron oxide absorption masses takes place particularly rapidly in reducing gases, since hydrogen and/or carbon monoxide, which are contained in the gases, rapidly reduce the iron oxide to the metal. Metallic iron quickly sinters, and this leads to marked shrinkage of the absorption masses and to a considerable loss of surface area. According to U.S. Pat. No. 4,155,990, an iron oxide absorption mass should therefore be used in which the iron oxide is mixed with a heat-stable, inert oxide such as silica or alumina. These absorption masses permit the removal of hydrogen sulfide at temperatures above 600° C. The regeneration of the absorption mass takes place at temperatures above about 700° C.; oxygen oxidises the iron sulfide to iron oxide and sulfur dioxide.

Although the admixing of a non-reducible, heat-stable oxide prevents the shrinkage of the absorption mass, the process of U.S. Pat. No. 4,155,990 is not free of problems. To convert a considerable fraction of the iron oxide into the sulfide, a temperature of at least about 600° C. is necessary. The regeneration of thick iron sulfide layers by reaction with oxygen also requires high temperatures. Subsequent industrial catalytic processes for the conversion of coal gas into hydrogen or methane require inlet temperatures of 300° C. to 500° C. In contrast to the low temperature processes discussed above, additional cooling of the purified gas is necessary here. The optimal temperature range which should be used to remove hydrogen sulfide from reducing gases such as coal gas is therefore at about 300° to 500° C.

A relatively large disadvantage in the process of U.S. Pat. No. 4,155,990 is the presence of reduced iron in the absorption mass. Depending on the pressure and the composition of the gas to be purified, the carbon monoxide contained therein can be quickly subjected to a disproportionation reaction on the reduced iron to give carbon and carbon dioxide at temperatures of about 600° C. Carbon can even be formed at temperatures up to 800° C. The deposition of carbon leads to deactivation and to blockage of the absorption mass. Carbon is deposited particularly in those areas of the absorption mass where sulfur had not yet been taken up. Regardless of this, iron oxide catalysts must be treated very carefully with gases containing carbon monoxide, since iron-carbonyl compounds, which are extremely undesirable, can form at temperatures below about 200° C.

German Offenlegungsschrift No. 2,144,567 describes the desulfuration of hydrocarbons by means of a desulfuration mass consisting of a porous support which has a high specific surface area and to which cupric oxide has been applied. This mass is prepared by impregnating the porous support material with an aqueous copper salt solution and drying. This produces a mass which, even after calcination, contains the cupric oxide in coarse grains, a fact which also applies to the other known reaction masses described above. Desulfuration using this mass can therefore be carried out only at relatively low temperatures, since the mass sinters at higher temperatures. Regeneration is involved and requires several process steps. The amount of absorbed sulfur decreases sharply as the number of regenerations increases (compare Example 5 of German Offenlegungsschrift No. 2,144,567).

The object of the present invention is to obviate the above disadvantages as far as possible and to find a reliable and industrially simple process for removal of sulfur compounds from gases. Another object of the invention is to obtain sulfur or sulfur-containing compounds in a relatively high concentration in the regeneration of the absorption mass, something difficult to achieve up to now. The otherwise necessary enriching is thereby avoided. The present invention accordingly relates to a process for removal of sulfur compounds, in particular hydrogen sulfide, from gases by passing the gases over an absorption mass containing metal oxides which react with the sulfur compounds to give metal-sulfur compounds and for regeneration of the absorption mass by oxidation of the metal-sulfur compounds, which is characterised in that (a) the metal oxides are present on an inert, refractory support which has a specific surface area of more than 10 $m^2$ per g,
(b) the support is loaded with the metal oxide in an amount of at least 5% by weight, calculated as metal of the active component and relative to the weight of the support,
(c) at least 20% by weight of the metal oxides on the support are present in finely divided form with a particle size of less than 40 nm,
(d) the gases are passed at a temperature of 5° to 800° C. over the support loaded with metal oxide, and
(e) the support loaded with metal-sulfur compounds is regenerated by passing over of gases containing oxidising agents.

The abbreviation "nm" used in this application refers, of course, to nanometers.

Suitable metal oxides deposited on the support can be determined on the basis of known thermodynamic data. Reference is made for this purpose to P. R. Westmoreland and D. P. Harrison, *Environmental Science and Technology*, 10 (7) (1976) pages 659–661. Examples of suitable oxides are those of chromium, cobalt, copper, iron, manganese and vanadium. Whilst the reduction of oxides hitherto used for the process of removal of hydrogen sulfide leads to considerable sintering, as shown above, this is surprisingly not the case with the oxides used in accordance with the invention and deposited in finely divided form on supports.

For example, cobalt oxide and copper oxide, which are readily reduced to the corresponding metals, can therefore be employed virtually without any problems in the process according to the invention. Copper oxide is particularly interesting, since it does not significantly catalyse the disproportionation of carbon monoxide. There is therefore no significant deposition of carbon and hence no deactivation of the absorption mass.

Owing to the state of fine division on the support material, the melting point of the metal is not of great importance. The metal particles, which are essentially not in contact with one another, hardly sinter. It is therefore possible to use even the oxides of bismuth, cadmium, lead and tin. The metal oxides are reduced on passing over of gases at the temperature of the desulfuration, 5° to 800° C. As already explained, they do not accelerate the disproportionation of carbon monoxide, a fact which is extremely advantageous.

Surprisingly, there is no significant sintering of the metal oxides, which are deposited in finely divided form on the surface of the heat-stable support materials, in the desulfuration. There is therefore, surprisingly, no significant shrinkage of the absorption mass during use. A further advantage of the absorption mass used according to the invention is that the metal particles or metal oxide particles do not disintegrate during the loading with sulfur and the regeneration. Large particles of these solids are fractured after several cycles of loading and regeneration. The extremely small particles formed on fracture are carried away in the gas stream.

In the process according to the invention, such a disintegration of the absorption mass virtually does not occur.

A further advantage of using the absorption mass of finely divided metal or metal oxide on the support material is that the reactivity is considerably higher than that of large crystallites. Provided large crystallites are not fractured, this being disadvantageous for the reasons explained above, the sulfide ions and the oxygen ions must be transported through thick layers for a considerable fraction of the metal (oxide) to react with the corresponding sulfide. Accordingly, even metals or metal oxides which react to give thick sulfide layers can be used for the process according to the invention. The large ratio of surface area to volume of the absorption masses used according to the invention results in a large ratio of sulfur to metal, which can be obtained even at low temperatures. A sulfur/metal ratio of 0.8 (atom/atom) can be obtained already at about 300° C. The large surface area/volume ratio also permits regeneration at low temperatures. For complete regeneration of the absorption masses temperatures of below about 500° C. are as a rule sufficient.

As already explained above, the formation of metals or metal oxides which catalyse the disproportionation of carbon monoxide is highly undesirable. The deposition of carbon deactivates the absorption mass and can lead to blockage of the absorption reactor. Iron oxides and vanadium oxides cannot therefore be used for gas mixtures containing significant amounts of carbon monoxide. This applies to the absorption masses used according to the state of the art. Since iron oxide is readily accessible and extremely inexpensive, this is extremely unfortunate. It has now been found, surprisingly, that on using absorption masses according to the invention these difficulties do not arise even when they contain iron oxide or vanadium oxide as a metal oxide. Surprisingly, iron oxide and vanadium oxide, if they are deposited in the fine state defined above on an oxidic support, lose their activity in respect of disproportionation of carbon monoxide. It is therefore accordingly possible to use in the process according to the invention even absorption masses containing iron oxide and vanadium oxide for gas mixtures containing considerable amounts of carbon monoxide.

The use of iron oxide absorption masses according to the invention has the additional advantage that in their regeneration elemental sulfur is obtained directly, as will be explained in more detail later. These absorption masses therefore have the particular advantage over the known, industrially widely used processes of physical absorption of hydrogen sulfide in solvents that, on regeneration of the loaded absorption mass, sulfur is obtained directly in one stage, whilst, according to the state of the art, hydrogen sulfide must first be expelled from the liquid absorbent and further processed into sulfur in an additional known process. The absorption using liquid absorbents already requires extensive expensive equipment; 15 to 25 m high absorption towers are required. In addition, extensive and expensive equipment for obtaining sulfur from hydrogen sulfide must be built and operated. In contrast, a relatively small absorption reactor is sufficient according to the invention.

According to the invention, many compounds, provided they have a large specific surface area, can be used as inert, refractory or heat-stable support materials. It is possible to use products known from the state of the art, such as alumina, silica, silica-alumina, silica/magnesium oxide, zirconium dioxide, silica/zirconium dioxide, titania, silica/zirconium dioxide/titania, crystalline or amorphous aluminosilicate molecular sieves and metal phosphates.

It is preferable that the support is loaded with the metal oxide in an amount of at least 20% by weight, preferably at least 40% by weight, calculated as metal of the active component and relative to the weight of the support.

It is also preferable that at least 50% by weight of the metal oxides on the support are present with the above-defined particle size of less than 40 nm, preferably less than 20 nm.

The amount mentioned is particularly present in a particle size below 15 nm and even more especially below 10 nm, since, in this case, the absorption and regeneration proceed rapidly and to completion. The lower limit for the particle size is not particularly critical and is about 1 nm, preferably 3 nm. If the particle size of the metal oxides is below this limit, substantial reaction with the oxidic support can take place. In the case of silica, for example, iron hydrosilicate or copper hydrosilicate can form, and in the case of alumina, iron-(II) aluminate or copper(II) aluminate can form. These compounds formed with the oxidic supports do not as a rule react with hydrogen sulfide as readily as the metal oxides and their formation should be avoided if possible. The particle size of the metal oxides forming the active materials should therefore be above about 1 nm depending on the type of the particular metal oxide and of the support and of the preparation process. Since, for example, iron(III) reacts less readily with silica than does iron(II), the particle size of iron(III) (hydroxide particles can be lower. On the other hand, vanadium pentoxide hardly reacts with alumina at temperatures below about 600° C. When vanadium pentoxide is used on alumina, an almost monomolecular layer can be used. The lower limit for the particle size therefore depends on the nature of the metal oxide/support material combination and can be readily determined.

The gas subjected to the process of the invention can also be a coal gas which has first been passed through a sulfur-resistant carbon monoxide shift catalyst. In this case a gas mixture is obtained which essentially contains hydrogen, carbon dioxide and steam. The hydrogen sulfide contained therein as an impurity can then be removed in accordance with the process of the invention.

The process of the invention can advantageously be used, inter alia, also for removal of sulfur compounds from natural gases. In this case also, the process can be carried out within the entire temperature range of 5° to 800° C. defined above. It is possible to subject natural gas in the state in which it is obtained, that is even with the particular present temperature, to the process of the invention. However, it is also possible to warm up the natural gas first, since then the capacity and rate of absorption are increased. Temperatures in the absorption step of 200° to 800° C. preferably and particularly preferably of 300° to 600° C., are in general possible.

Sulfur compounds contained in gases treated according to the invention are understood as meaning all those sulfur compounds which are contained in such gases to be purified and should advantageously be removed. The most frequently occurring sulfur compound of this type is hydrogen sulfide. COS is also important but not to the same extent. Other sulfur compounds are as a rule present only in extremely low amounts compared to abovementioned hydrogen sulfide and COS. Examples of these other sulfur compounds are $CS_2$, mercaptans, thiophene and the like, as known to an expert. In exceptional cases, should these last-mentioned compounds be present in relatively large amounts, these compounds, as known in this area of technology, would have to be first largely removed by processes which are in themselves known before the gases are subjected to the process of the invention.

The regeneration of the absorption masses is preferably effected in a stage different from that used for desulfurating the gases as described below. However, according to the invention the regeneration can also be carried out simultaneously by passing oxidising agents together with the gases to be desulfurated over the absorption mass. The gases to be desulfurated thus contain oxidising agents which, if necessary, are added to the gases available. The most suitable and most simple oxidising agent is also in this case oxygen. However, care must be taken that the amount of oxygen or of oxidising agent is not larger than necessary for reliberating the sulfur from the absorption mass. This embodiment of the process according to the invention is thus characterised in that the gases containing sulfur compounds contain oxygen in an amount which is such that the atomic ratio of oxygen to sulfur does not exceed 1. The amount of oxidising agent must thus be chosen to be such that no sulfur dioxide is formed, since the latter would otherwise be present in the treated gas, a result which is not desirable. Advantageously, the absorption of the sulfur compounds with simultaneous regeneration is controlled in such a way that, in the simultaneous regeneration, elemental sulfur is formed which can be separated simply from the treated gases in a manner which is in itself known.

The absorption masses used according to the invention are in themselves known but have hitherto not been used for the process according to the invention.

The absorption masses used according to the invention can be obtained by the following methods:

Method A

Coprecipitation of a precursor of the active material and the support.

As a rule products are obtained which must be decomposed at elevated temperatures, whereupon the support material and the active oxide are formed. The porous structure of the material thus prepared is usually not suitable for rapid migration of the products to be absorbed, through the absorption mass. However, these disadvantages do not arise when the coprecipitation of the active precursor is carried out in the form of oxalates or formates with magnesium oxalate or magnesium formate. The oxalates are decomposed at temperatures below 500° C., and finely divided oxides of the metals are obtained on magnesium oxide as support. This process is described in detail in W. Langenbeck, H. Dreyer and D. Nehring, *Naturwissenschaften*, 41 (1954) 332 and W. Langenbeck, H. Dreyer and D. Nehring and J. Welker, *Zeitschr. anorg. allgem. Chem.*, 281 (1955) 90. The process is applicable, for example, to the oxides of copper, cobalt, nickel and iron(II). Preparation examples of the preparation of absorption masses will be given below.

Method B

This method is the process described in the abovementioned German Pat. No. 1,767,202 in which precursors of active components are precipitated in a state of extremely fine division onto the suspended support material. This process is particularly suitable, for example, for the preparation of absorption masses containing copper, cobalt, tin or nickel as the active component on silica or alumina as the support. As already explained above, iron(III) precipitates can be obtained by this process only with difficulty or not at all. In contrast, the precipitation of iron(II) leads to excellent absorption masses for use in the process according to the invention.

Method C

This is a method for preparing an iron(III) oxide catalyst or absorbent in which an iron salt solution precipitates the iron by means of hydroxyl ions in the presence of a support and the loaded support is dried, and if appropriate, calcined, a solution of an iron(III) salt being passed with vigorous stirring into a suspension of the support under the surface of the suspension and the pH value of the suspension being maintained between 4 and 7 and separating the loaded support from the solution. The pH value of the suspension is preferably maintained between 5.5 and 6.5. It is also preferable that hydroxyl ions required for precipitating the metal oxide, which may be in hydrated form, are continually produced in the suspension by a chemical reaction which is in itself known. In a further preferable embodiment, the process is carried out in such a way that the pH value of the suspension is continually measured and the supply of iron(III) salt solution and, if appropriate, of the solution of alkali is controlled via controlling and regulating members in such a way that the pH value of the suspension is maintained within the range desired.

This process is described in detail in German Patent Application P 31 31 255.1.

It has been found that the absorption masses used according to the invention can be loaded and regenerated up to more than 10,000 times without the absorption capacity significantly decreasing or significant disintegration of the absorbent or a shrinkage of the absorbent taking place. On this point reference is made to the examples and the comparative example involving iron oxide without the use of a support material.

The process according to the invention is preferably used for reducing gases which contain low amounts of hydrogen sulfide. These reducing gases are preferably coal gas. The latter, as a dry gas, contains as a rule the following components:

25–50% of $H_2$
18–70% of $CO$
2–30% of $CO_2$
0–15% of $CH_4$
0.01–5% of $H_2S$
<–2% of $COS$, $CS_2$, $HCL$, $NH_3$ and the like.

For the industrial use of these gases for further processing steps it is extremely important that hydrogen sulfide is removed as far as possible, as already explained above in the description of the state of the art. The process of the invention achieves in an extremely simple manner an extremely substantial removal of hydrogen sulfide. The particular advantage of the process according to the invention is that the regeneration of the absorption masses is likewise possible in an extremely simple manner to give environmentally acceptable products, in particular elemental sulfur, when iron oxide is used as the active component of the absorption mass.

The temperature in the absorption can vary within wide limits and can hence be adapted to the prevailing conditions, that is to the temperature of the gases to be desulfurated. This is a particular advantage of the process according to the invention. As a rule, the absorption of hydrogen sulfide is carried out at temperatures of about 200° to 700° C., preferably of about 300° to 600° C.

The regeneration is as a rule carried out by means of a gas stream containing less than 6% by volume, preferably less than 5% by volume, of oxidising agent. In many cases oxygen is used as the oxidising agent since it is most readily accessible. However, sulfur dioxide and nitrogen oxide can also be used. Sulfur dioxide is particularly preferable when it is available for other reasons. The lower limit for the content of oxidising agent in the regenerating gas is not particularly restricted; however, the limit must be sufficiently high to obtain regeneration within an economically acceptable time. From this point of view, the lower limit for the oxidising agent is about 0.1% by volume. Good results are as a rule obtained when the oxidising agent, in particular oxygen, is present in an amount of about 0.3 to 4.0, preferably 0.5 to 2.5, % by volume in the gas stream for the regeneration. The regeneration produces as a rule sulfur dioxide. Surprisingly, in the case of cupric oxide absorption masses or catalyst masses, sulfur trioxide is obtained almost exclusively.

In the regeneration of absorption masses or catalyst masses containing iron oxide and used according to the invention a surprising reaction takes place. When the absorption mass loaded with sulfur is regenerated by passing over of a gas stream containing an oxidising agent, the bound sulfur is oxidised completely to elemental sulfur. This reaction takes place at temperatures from room temperature, that is about 20° C., up to about 700° C. When the oxidation is first carried out at temperatures below about 200° C., sulfur is carried away only to a small extent by the gas stream. It is then necessary to drive off the sulfur by means of an inert gas, such as nitrogen or carbon dioxide, at elevated temperatures above about 300° C., to which the absorption mass is heated. The sulfur vapour is then subsequently condensed from the inert gas. If the oxidation is carried out at temperatures above about 300° C., the elemental sulfur formed is carried away out of the absorption mass in the gas stream. In this step, care need only be taken to adjust the oxidation temperature and the amount of oxidising agent in the gas stream used for regenerating in such a way with respect to one another that further oxidation to sulfur dioxide is avoided. Care must therefore be taken particularly at the end of the regenerating stage that the oxygen content (oxygen is the preferred oxidising agent) is below about 0.5% by volume when the temperature of the absorption mass is 500° C. A few experiments can determine the suitable temperature range and the particular oxygen content, at the end of the regeneration stage, at which an undesirable oxidation reaction to sulfur dioxide is avoided when it is desirable to obtain only sulfur as the reaction product.

According to the state of the art, it was hitherto not possible to obtain sulfur directly by regeneration of absorbents in the sense of the invention. Rather, the sulfur dioxide obtained had to be processed in a technically elaborate manner to give elemental sulfur. This problem is dealt with in U.S. Pat. No. 4,155,990, where some of the sulfur dioxide is catalytically reduced to hydrogen sulfide, the reaction requiring considerable amounts of hydrogen. The concentrated hydrogen sulfide thus obtained is then reacted with some of the sulfur dioxide to give elemental sulfur. It is very difficult to keep the temperature at a level sufficiently low to maintain the equilibrium within a favourable range in which the conversion to elemental sulfur proceeds largely to completion. It is also known from the U.S. patent specification mentioned that sulfur dioxide, not sulfur, is formed in customary iron catalysts when using oxygen in the regeneration.

An essential advantage of the process according to the invention is thus that, when it is carried out on the basis of the use of the special absorption masses defined above, elemental sulfur is directly obtained on regeneration and the involved conversion required according to the state of the art of sulfur dioxide to elemental sulfur is hence avoided.

It is advantageous in particular when iron absorption masses according to the invention are used that the gases from which the sulfur compounds are removed are reducing gases, so that formation of elemental sulfur is avoided during the absorption. If the gases contain oxidising agents, regeneration takes place virtually simultaneously with the formation of sulfur. If the active metal used is not iron, sulfur dioxide is formed, or in the case of copper, sulfur trioxide. The process according to the invention can, however, also be carried out in such a way that the gases contain oxidising agents and, as just described, regeneration takes place simultaneously with the formation of sulfur, sulfur dioxide or sulfur trioxide respectively, depending on the type of absorption mass used. These products formed must then be separated from the gas stream leaving the absorption bed.

The term "metal oxides", which are present in finely divided form on the support, are in the sense of the present invention also understood as meaning hydrated oxides or hydrosilicates, which, as known to an expert, can form according to the preparation temperature and the vapour pressure of water. This applies in particular to iron oxide absorption masses in which the iron can be present as FeOOH, $Fe_3O_4$ or $Fe_2O_3$ as a function of the temperature and the vapour pressure of water. The absorption capacity is not impaired by a particularly low water content.

The regeneration of absorption or catalyst masses used according to the invention takes place very rapidly by passing over of gases containing oxidising agents. However, the heat of reaction, in particular when using oxygen as the oxidising agent, is considerable:

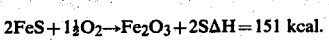
$$2FeS + 1\tfrac{1}{2}O_2 \rightarrow Fe_2O_3 + 2S \Delta H = 151 \text{ kcal.}$$

The content of the oxidising agent in the gas stream used for regeneration can be used to control the temperatures in the regeneration and, in particular, to avoid undesirable high temperatures. The content of the oxidising agent is advantageously so chosen that the temperature is between 200° and 700° C., preferably between 400° and 550° C.

The invention is illustrated by means of the following examples without being limited to them.

Preparation of catalyst and absorption masses

Preparation Example I (Method A)

6 kg of $MgCl_2$ and 1.4 kg of $Fe(II)Cl_2$ were dissolved in 600 l of deionised water. Separately from this, 5.1 kg of $(NH_4)_2C_2O_4.H_2O$ were dissolved in 300 l of deionised water at 50° C. The solution of ammonium oxalate was added to the stirred solution of magesium chloride and iron chloride. The resulting mixture was stirred for 42 hours at room temperature. The precipitated solids were then filtered off and washed with cold water. The washed, slightly yellow material was dried for 48 hours in vacuo at 40° C. The dried material was placed in a rotating calcination furnace and decomposed in an air stream at 400° C. After the decomposition, the powder was tabletted. The ratio of iron to magesium oxide was 1:4. The iron content was 20% by weight.

The X-ray diffraction diagram of the decomposed material showed relatively sharp diffraction maxima for magnesium oxide and strongly broadened bands for iron(III) oxide. A sample was comminuted by means of ultrasound in ethanol, and the investigation of a drop of this dispersion on a carbon film in a transmission electron microscope showed that the particles have a diameter of about 10 nm and are homogeneously distributed within the support.

Preparation Example II (Method B)

29.1 kg of $Cu(NO_3)_2.3H_2O$ were dissolved in 800 l of water in accordance with the process described in German Pat. No. 1,767,202. 14.7 kg of finely divided silica (AEROSIL, registered trademark) having a specific surface area of 200 m$^2$/g were then suspended in the solution. The temperature of the stirred suspension was raised to 90° C., and 22.2 kg of urea dissolved in 50 l of water were then quickly added to the suspension. Before the addition of the urea solution, the pH value of the suspension was adjusted to 2.1 by adding nitric acid.

Within 30 minutes of the addition of urea, the pH value increased to 3.85. It then dropped to about 3.6. It then increased in the course of 8 hours to 3.85. In the following 2 hours it increased to 5.35. During the next 9 hours it fell to 5.0.

The loaded green support material was filtered off and dried at 120° C. The copper content corresponded to a ratio of copper to silica of 0.52. The mass contained 34.2 % by weight of copper. The mass did not have an X-ray diffraction diagram either before or after calcination at 450° C. After reduction in a hydrogen stream at 350° C. and leaving to stand in air at 20° C., the X-ray diffraction spectrum showed the very broad maxima of copper oxide. Another sample of the reduced material was embedded in a polymerisable monomer, the monomer was polymerised, and ultrathin sections were prepared of the hardened polymer. Investigation of the ultrathin sections in a high resolution electron microscope showed the presence of metallic copper particles. Most of these particles had a diameter of about 15 nm.

Preparation Example III (Method B)

An absorption mass was prepared in accordance with the process of German Pat. No. 1,767,202 with the use of iron(II). 11 kg of iron powder (ferrum reductum) were dispersed in 24 l of deionised, oxygen-free water. 24 l of concentrated hydrochloric acid (38% by weight of HCl) were then added. After 12 hours only a small amount of metallic iron was left in order to prevent the formation of iron(III).

8 kg of urea were dissolved in 800 l of water. 4 kg of finely divided silica (AEROSIL, registered trademark) having a specific surface area of 380 m$^2$/g were suspended in the solution. The solution was heated for 30 minutes at 90° C. under an atmosphere of nitrogen to remove dissolved oxygen. The pH value of the suspension was adjusted to 2.0 by adding hydrochloric acid. The suspension was then cooled down in an atmosphere of nitrogen to 25° C., and 18 l of the above iron(II) chloride solution containing 4 kg of iron were added. The temperature was then increased to 90° C. The pH value of the suspension rose in the course of 30 minutes to 5.8. It then fell to 5.3 and remained at this level for 24 hours. It then increased to 7. The colour of the loaded support was white. All of the iron(II) had precipitated on the support.

During the filtration of the loaded support the iron(II) underwent oxidation with the result that the colour of the loaded support changed to blue-green. It was washed with water and dried for 24 hours at 120° C. The dried material had a reddish colour. The iron/silica ratio was 1:1. The iron content was 50% by weight.

The X-ray diffraction diagram of the dried material showed only few broad bands, which did not correspond to the maxima bands of iron oxide. Investigation of the ultrasonically dispersed material on a carbon film in the electron microscope showed the presence of very small, thin platelets. The thickness of the curved iron(II) hydrosilicate platelets was about 2 nm with their lateral extension being about 20 nm. The specific surface area of the silica had increased from 380 m$^2$/g to 500 m$^2$/g, which proves that the silica had been attacked by iron(II) ions.

The iron in the mass can be reduced to iron(II) by means of a hydrogen stream at 400° C. To carry out a reduction to metallic iron, heating to temperatures above 800° C. must be carried out.

Preparation Example IV (Method C)

The hydroxyl ions for the precipitation of the hydrated oxide were formed by hydrolysis of KCNO in accordance with the following equation:

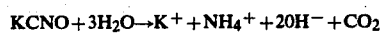

$$KCNO + 3H_2O \rightarrow K^+ + NH_4^+ + 2OH^- + CO_2$$

This reaction proceeds sufficiently rapidly already at 350° C. The formation of bubbles in the injection tube must be avoided. However at the temperature mentioned bubbles are not formed.

8 kg of KCNO were dissolved in 600 l of deionised water. 4 kg of finely divided silica (AEROSIL, registered trademark) having a specific surface area of 380 m$^2$/g were then suspended in the solution. The temperature was increased to 38° C. 200 l of deionised water in which 4 kg of $Fe(NO_3)_3.9H_2O$ had been dissolved, were then passed through two injection tubes to below the surface of the vigorously stirred suspension. The injection of this 200 l solution took 26 hours. During the injection the pH value remained within the range from 5.7 to 6.2.

The pale brown loaded support settled out rapidly. It was separated from the liquid by decanting, washed with water and dried for 24 hours at 120° C. The iron/silica ratio was 1:4. The iron content was 20% by weight.

The X-ray diffraction diagram of the dried material showed strongly broadened bands at the position for α-FeOOH. Water is lost on heating to 800° C. The finely divided iron(III) oxide thus heated reacted at room temperature with atmospheric moisture to give α-FeOOH. The treatment at 800° C. has considerably sharpened the X-ray diffraction maxima.

In the transmission electron microscope, very small iron oxide particles which are very uniformly distributed over the surface of the support material can be seen. The diameter of the particles was about 4 nm.

The iron(III) on the loaded support can be reduced at 400° C. by means of a stream of hydrogen gas to iron-(II). If the loaded support is treated for 48 hours at 600° C. with a stream of hydrogen gas, no metallic iron is obtained. Even at 800° C., no significant reduction to metallic iron could be observed.

EXAMPLE 1

A cylindrical reactor having a diameter of 1 cm was filled up to a level of 2.5 cm with 2 ml of the absorbent prepared according to Preparation Example II. This amount of absorbent contained 0.2 g of copper.

A gas mixture containing 1% by volume of $H_2S$, 10% by volume of $H_2$, 10% by volume of CO and the remainder nitrogen was passed with a space velocity of $2,000h^{-1}$ over this absorbent.

In FIG. 1, the $H_2S$ content in the gas leaving the reactor is plotted as a function of time. Experiments were carried out at 300° C., 400° C. and 500° C. It can be seen from FIG. 1 that after about 30 minutes $H_2S$ broke through the absorption bed, due to the fact that saturation of the absorbent had occurred. The difference in saturation time observed at the different temperatures is essentially within the experimental error limit. The fact that the temperature did not influence the absorption capacity shows that the reaction of copper (oxide) with $H_2S$ does not determine the rate of the process as would have actually been expected in the case of the extremely small copper oxide particles of the reaction mass. In the state of saturation, the atomic ratio of sulfur to copper was about 0.5. The saturation value probably remained below 1.5 because a considerable fraction of the copper ions had formed a stable copper hydrosilicate. The sharp increase in the $H_2S$ content in the residual gas demonstrates the virtually ideal character of the absorption masses and the virtually ideal absorption in the process according to the invention. The absorption mass can thus be used up to the maximum loading level before significant amounts of hydrogen sulfide occur in the residual gas. The $H_2S$ content, until the sudden increase after about 30 minutes, is below 0.1 ppm in the residual gas.

The absorption mass was regenerated by passing over of a stream of nitrogen containing 1% by volume of oxygen at 300° to 500° C. Only sulfur and sulfur trioxide, but no sulfur dioxide, were obtained. A regeneration temperature of about 500° C. is preferable, since the formation of sulfur and sulfur trioxide from the loaded absorption mass then takes place more rapidly. It was possible to repeat absorption and regeneration more than 1,000 times without the absorption capacity having been significantly reduced. Regeneration took about 25 minutes at the oxygen content used. In the regeneration, no significant temperature increase was observed. When the regeneration was carried out by means of a gas stream containing a higher oxygen content, for example 20% by volume, it was possible to determine a temperature increase of 80° C. by means of a thermocouple in the absorption mass.

These values were obtained in the laboratory reactor described above, which had been equipped with a heating and cooling unit. Sharper temperature increases at high oxygen contents must be expected to occur when operating under industrial conditions.

EXAMPLE 2

To prepare a vanadium oxide/alumina absorption mass, nitric acid was injected into a suspension of finely divided alumina (specific surface area 176 $m^2/g$) in a solution of ammonium metavanadate. The pH value gradually decreased to 2.5. At this pH value, all of the vanadate had precipitated onto the alumina. $V_2O_5$ or other vanadium compounds could not be determined in the X-ray diffraction diagram. Neither could vanadium oxide particles be made out under the electron microscope. The loaded support contained 6% by weight of vanadium.

Figure 2:
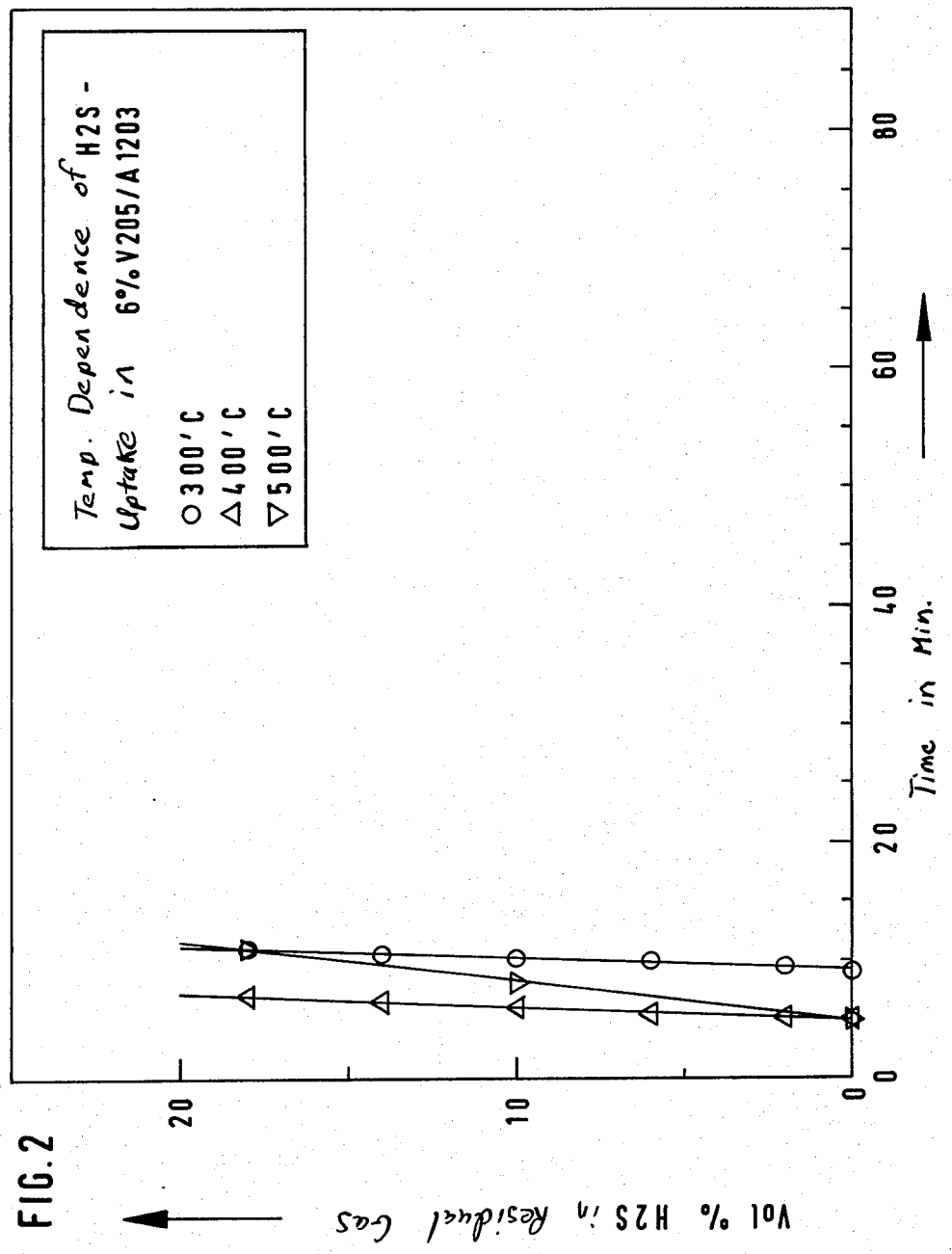

The reactor used in Example 1 was filled with 2 ml of the absorption mass. A gas mixture containing 1% by volume of $H_2S$, 10% by volume of $H_2$, 10% by volume of CO and a nitrogen remainder was passed over the absorbent with a space velocity of $2,000h^{-1}$. The absorption bed contained 0.164 g of vanadium. FIG. 2 shows the $H_2S$ concentration in the residual gas as a function of time. The atomic ratio of sulfur to vanadium on break through was 0.11. In this case also, the absorption capacity did not depend on the absorption temperature. The $H_2S$ content in the residual gas was below 0.1 ppm until breakthrough.

The regeneration was carried out as in Example 1 by passing over of a stream of nitrogen containing 1% by volume of oxygen. The gas obtained contained sulfur vapours and a small amount of sulfur dioxide. The regeneration can be carried out at 300° to 500° C. The development of sulfur vapours is most rapid at 500° C.

The regeneration takes 7 minutes at the oxygen content mentioned. The regeneration time is essentially independent of the temperature within the temperature range of 300° to 500° C.

EXAMPLE 3

The absorption mass described in Preparation Example IV was used. The experiment was carried out as in Example 1 with the use of 2 ml of the absorption mass.

Figure 3:
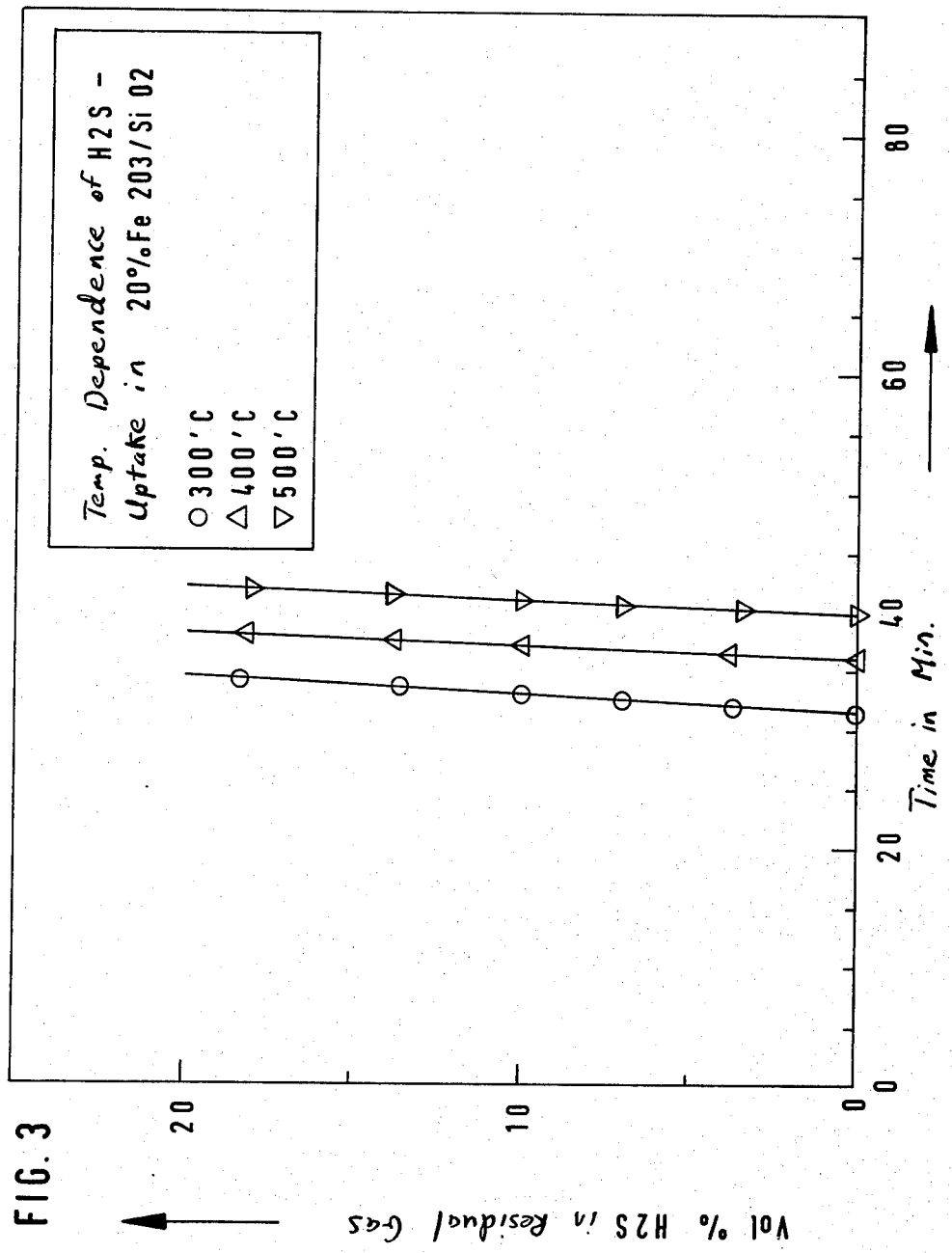
Figure 4:
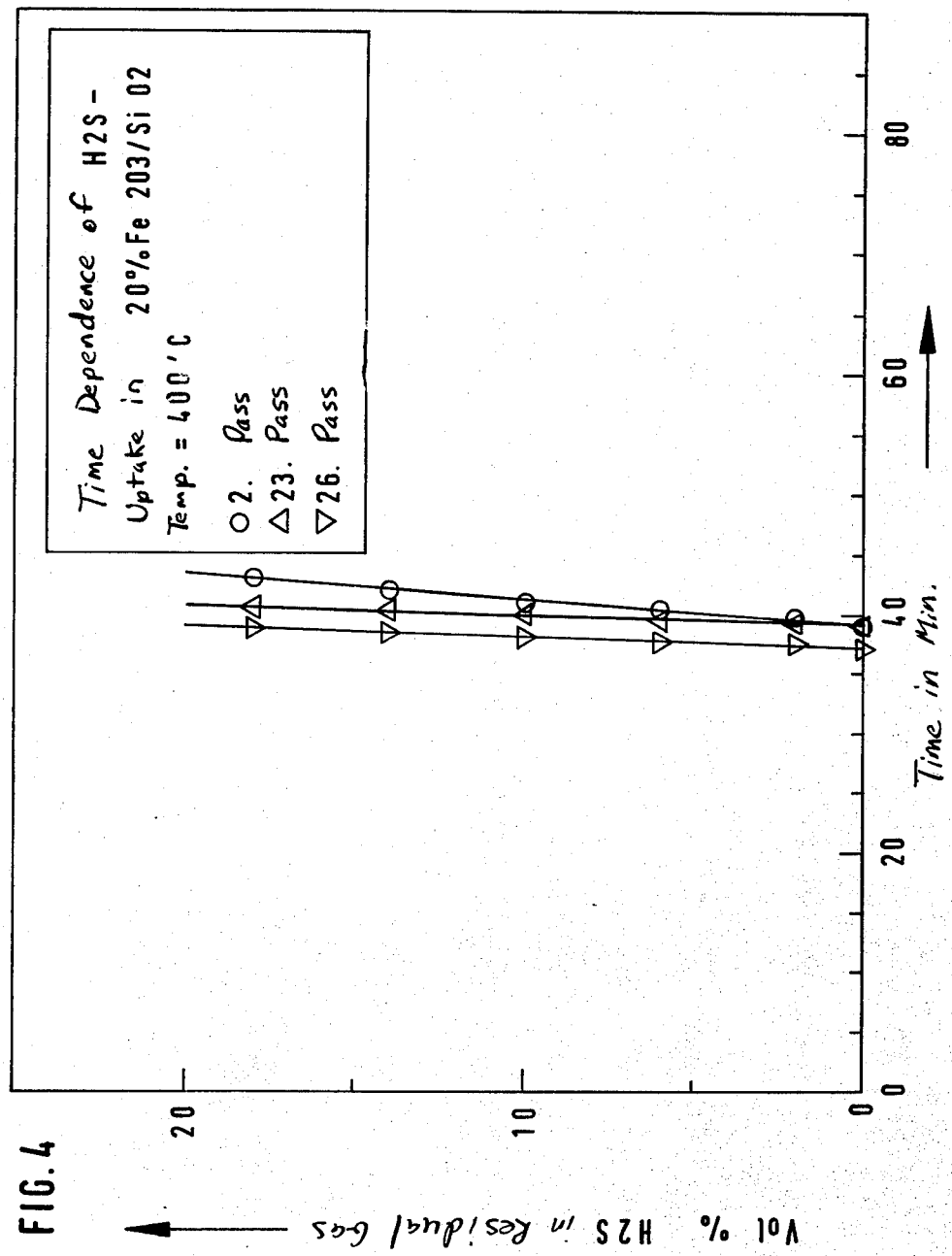

In FIG. 3 the residual concentration of $H_2S$ is plotted as a function of time. The $H_2S$ concentration suddenly increases after 30 to 40 minutes. The different values at different temperatures (300° to 500° C.) are again essentially due to experimental error limits. The sulfur/iron ratio was 0.35 on breakthrough. The reason for this low ratio lies in a marked reaction with the formation of iron(II) hydrosilicate. Before the sharp increase in the $H_2S$ concentration (breakthrough) the content of $H_2S$ was below 0.1 ppm. To demonstrate the stability of the absorption mass, the $H_2S$ concentration has been plotted as a function of time in FIG. 4 at 400° C. after 2, 3 and 26 passes. There is no significant loss in activity. There is virtually no change even after 1,000 regenerations.

The regeneration was carried out as in preceding examples by means of 1% by volume of oxygen at 300° to 500° C. Only elemental sulfur was obtained. The regeneration was most rapid at 500° C.

At 300° to 500° C. the regeneration time is essentially temperature-independent. The regeneration time is essentially determined by the oxygen content in the gas stream during the regenerating and was 35 minutes in this example.

EXAMPLE 4

The procedure described in Example 3 was followed. However, the regeneration of the absorbent was carried out in an alternative manner at 250° C. Nitrogen containing 2% by volume of oxygen was passed at this temperature through the absorption mass. The oxygen supply was turned off after 35 minutes, and the reactor was heated to 400° C. During this step, the elemental sulfur contained in the absorption mass volatilised and deposited onto the cold parts of the reactor.

In another experiment, the regeneration was carried out with air at room temperature. All the iron of the absorption mass was converted in the course of 6 hours into $Fe_3O_4$. The sulfur was present as elemental sulfur and was removable by heating the absorption mass in a stream of nitrogen to about 400° C.

Comparative experiment

Solid iron oxide was used as absorption mass, prepared according to Method C, but without the use of a suspended support material. The X-ray diffraction diagram of the dried material showed broadened maxima of $\alpha$-FeOOH. Under the scanning electron microscope the material appeared as approximately 0.5 $\mu$m spherical conglomerates. The particles forming the conglomerate had an estimated size, based on the broadening of the X-ray diffraction maxima, of about 50 nm.

The experiment was carried out as in the preceding example. The absorption mass used contained 0.315 g of iron.

Figure 5:
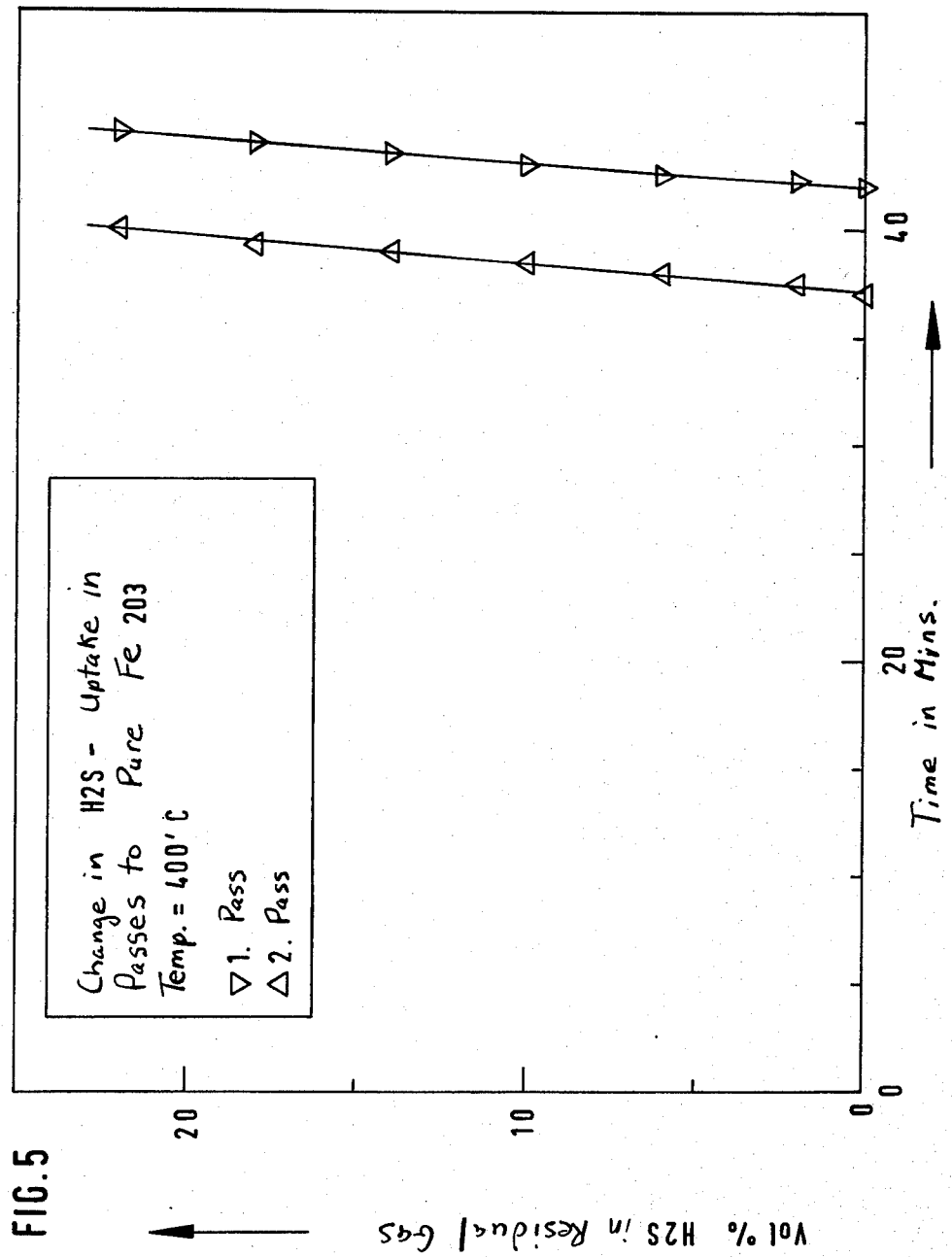

In the first experiment, an increase in the $H_2S$ concentration in the residual gas was observed after only 10 minutes, but considerable absorption of $H_2S$ took place for more than 140 minutes. Even after 300 minutes significant $H_2S$ absorption could still be observed. After regeneration, the behaviour of this absorption mass was similar to that of a mass containing supported iron oxide, as can be seen from FIG. 5. The time to the sharp increase in concentration decreases with the number of regeneration cycles. Furthermore, the increase in $H_2S$ concentration is less sharp after 3 and more regenerations. After 11 regenerations, the time had dropped to 30 minutes.

The absorption mass shrank to a considerable extent on loading and regenerating. After 11 regenerations the volume was only 1.7 ml due to sintering and disintegration of the particles. The gas stream has carried away particles of the absorption mass. The particles of the absorption mass have also become very fragile after about 10 regenerations. The regenerating was carried out as in preceding examples at temperatures of 300° to 500° C. Essentially sulfur dioxide escaped within this range. The proportion of sulfur was low. Regeneration was very much slower than in the examples. Whilst loading took about 30 minutes, about 3 hours at 500° C. were necessary for regeneration. At lower temperatures regeneration took even longer.

EXAMPLE 5

The absorption mass obtained according to Preparation Example III was used. The experimental procedure was as in Example 1 with the use of 2 ml of absorption mass. Loading was effected at 400° C. The $H_2S$ concentration was below 0.1 ppm in the residual gas for 63 minutes. It then increased sharply to 1% by volume. At this time the ratio of sulfur to iron was 0.44.

Regeneration was carried out at 500° C. by means of a stream of nitrogen containing 1% by volume of oxygen. Only elemental sulfur escaped as a vapour. Regeneration took 60 minutes. There was no significant change in the absorption capacity after a large number of loading and regenerating cycles.

EXAMPLE 6

The absorption mass used was iron oxide prepared in accordance with Method B on titania as support. The support material was finely divided titania having a specific surface area of 50 m$^2$/g (P 25 from Messrs. Degussa, Federal Republic of Germany). Precipitation was effected by hydrolysis of urea in an atmosphere of nitrogen. The catalyst mass contained 20% by weight of iron.

The experimental procedure was as described in Example 1. 2 ml of absorption mass were used. The space velocity was 2000 h$^{-1}$. The amount of absorption mass used contained 0.16 g of iron.

Figure 6:
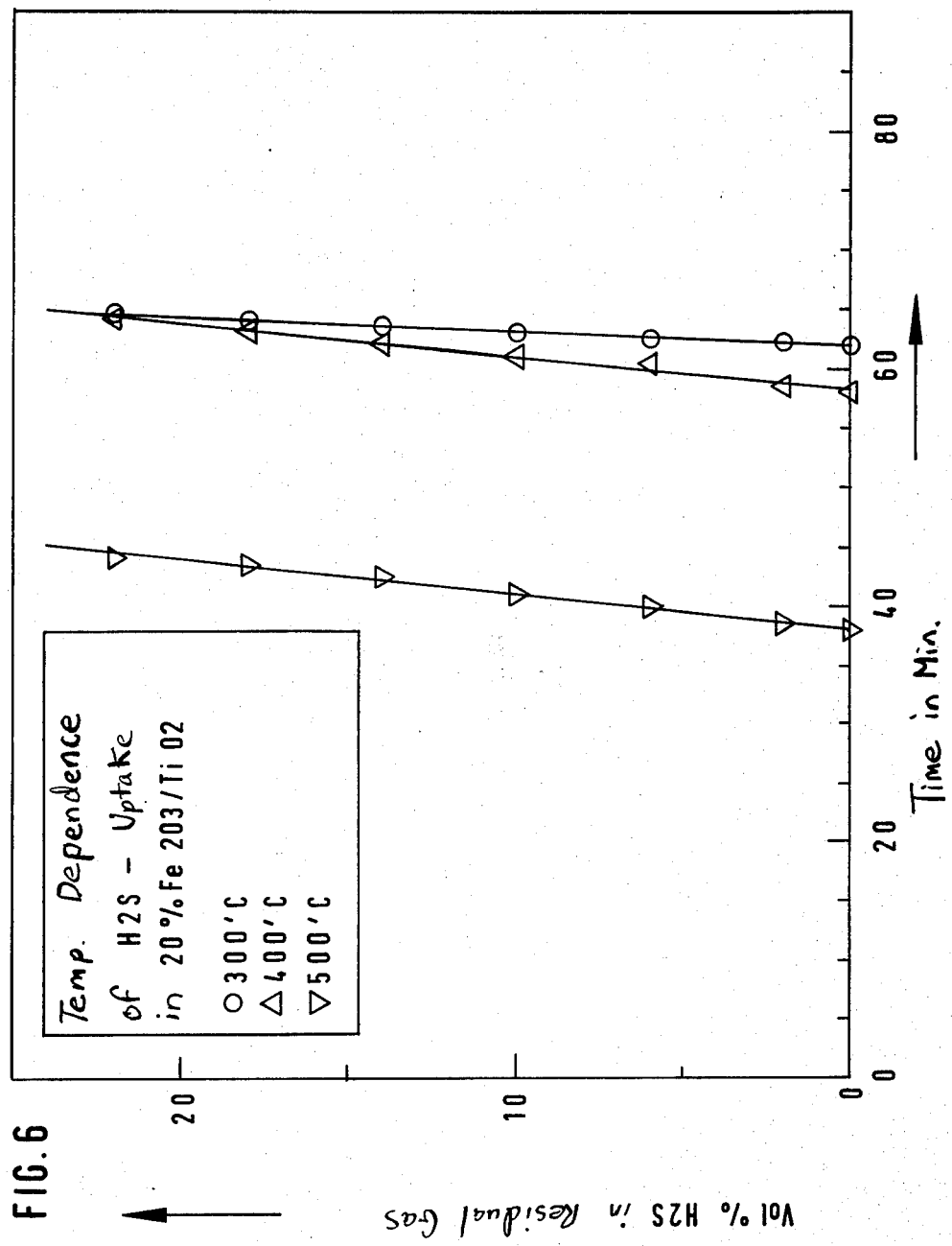

In FIG. 6, the $H_2S$ concentration in the residual gas is plotted as a function of time. The $H_2S$ content was below 0.1 ppm before the sharp increase. It can be seen from FIG. 6 that the concentration increased sharply after a considerably shorter time at 300° C. than at 400° C. and 500° C.

At 300° C. the atomic ratio of sulfur to iron at breakthrough was 0.25 and at 400° C. to 500° C. 0.68. When the $H_2S$ concentration in the residual gas had reached the value of 1% by volume (this is the content of the supplied gas), the ratio was 0.98 at 500° C. and 0.85 at 400° C.

Figure 7:
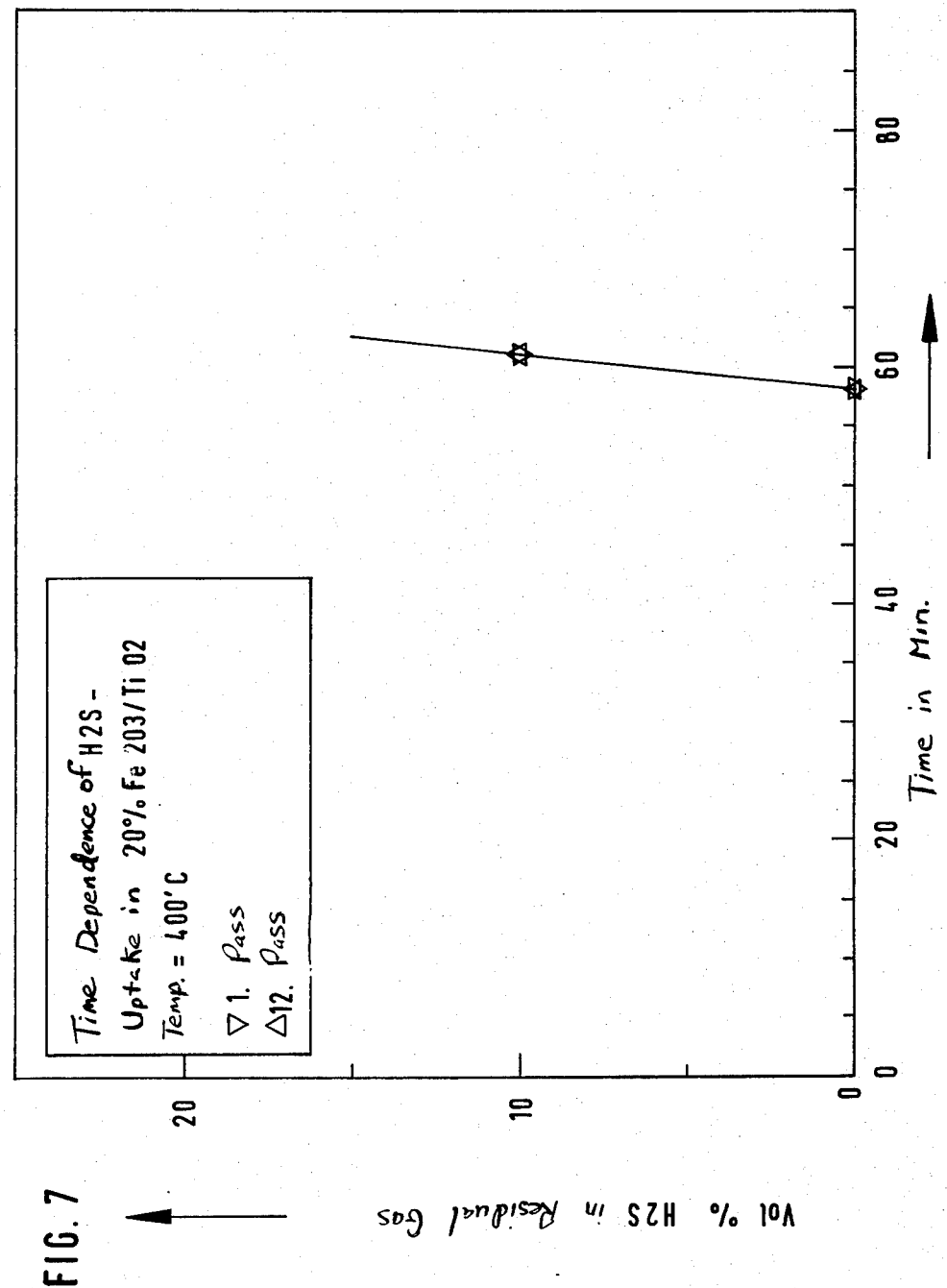

FIG. 7 demonstrates the stability of the absorption mass: curves measured for 400° C. show virtually no difference between the fresh absorption mass and the 12-fold regenerated absorption mass.

Regeneration was carried out as described in preceding examples using a stream of nitrogen containing 1% by volume of oxygen. The sole reaction product was elemental sulfur in the form of a vapour. The formation of sulfur was more rapid at 500° C. than at 300° C.

EXAMPLE 7

Figure 8:
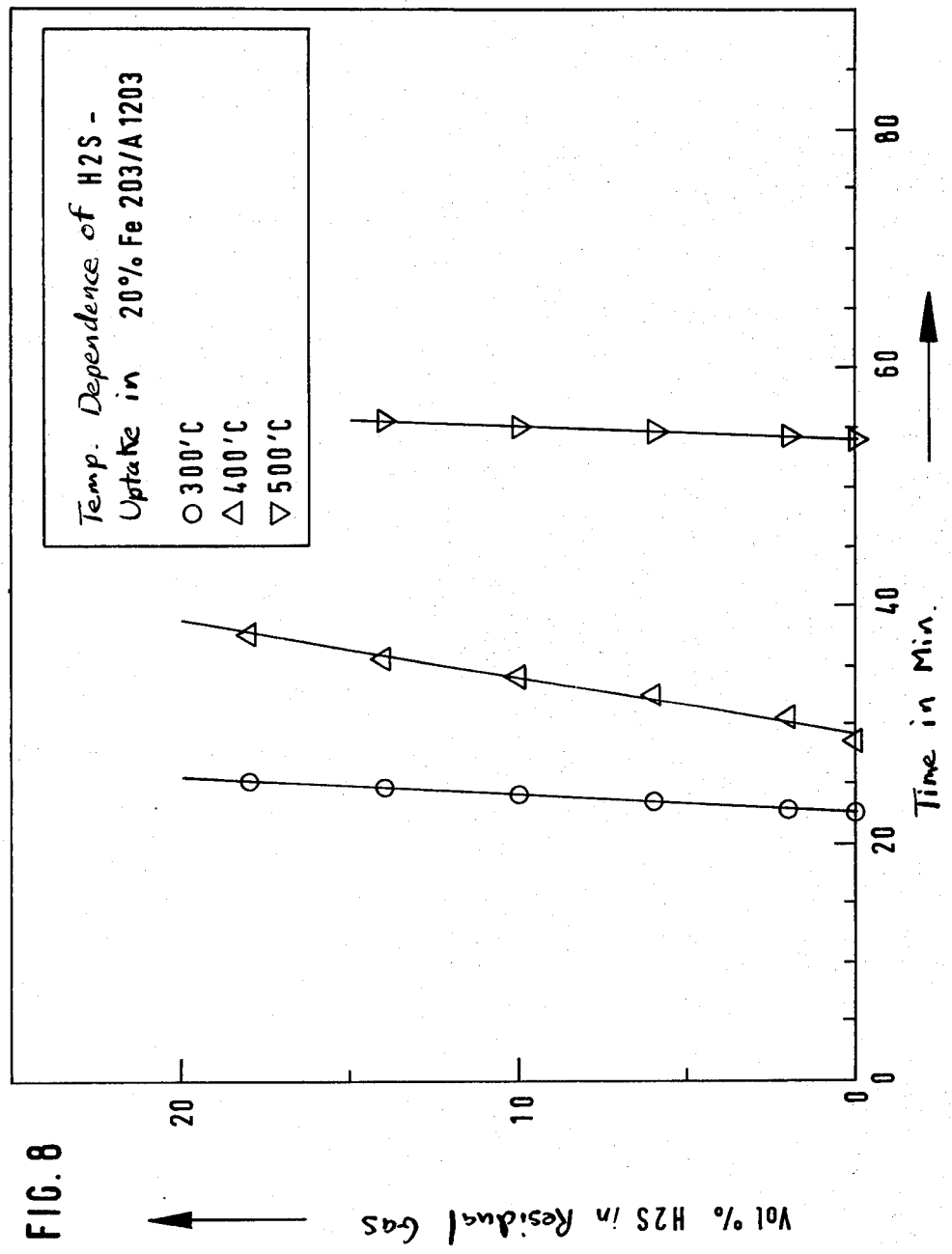

The absorption mass used was iron oxide precipitated according to Method B onto finely divided alumina. The alumina had a specific surface area of 176 m$^2$/g (P 1401 from Messrs. HARSHAW, Netherlands). The precipitate was produced by hydrolysis of urea in an atmosphere of nitrogen with the use of iron(II) salt. The iron content was 20% by weight. The experimental procedure was as in Example 1 with the use of 2 ml of absorption mass. In FIG. 8, the $H_2S$ concentration in the residual gas is plotted as a function of time. The $H_2S$ concentration was below 0.1 ppm before the sharp increase. It can be seen from FIG. 8 that the absorption capacity increases with temperature. At 300° C. there is the sudden increase in the $H_2S$ concentration at a sulfur/iron ratio of 0.29, at 400° C. of 0.31 and at 500° C. of 0.7.

Regeneration was carried out as described in the preceding examples at 500° C. Complete regeneration took 100 minutes. The gas stream leaving the absorbent contained in addition to elemental sulfur about 0.1% by volume of sulfur dioxide.

Figure 9:
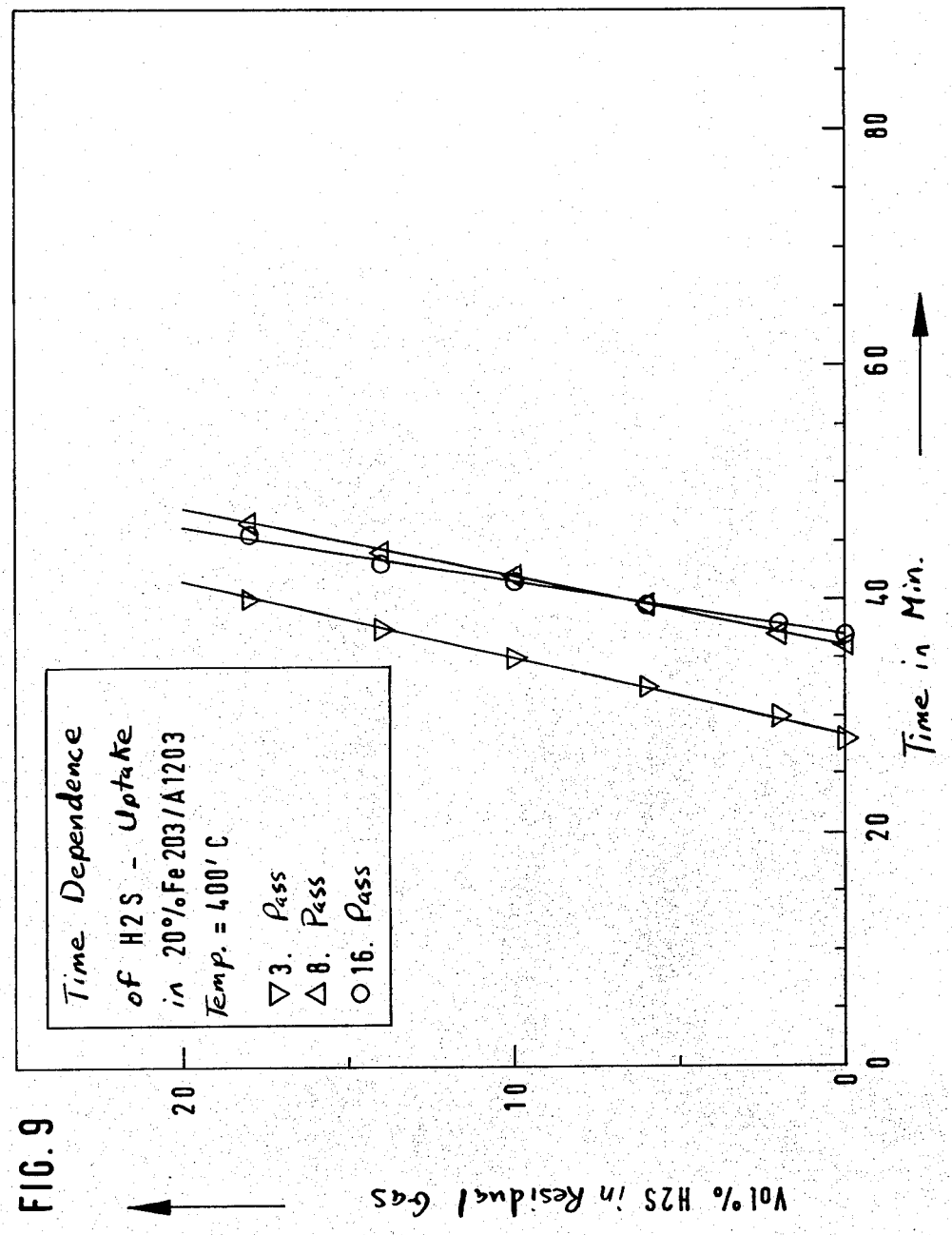

FIG. 9 shows the effect of loading and regenerating. The capacity increases up to 8 regenerating cycles. It then remains at a virtually constant value.

EXAMPLE 8

Figure 10:
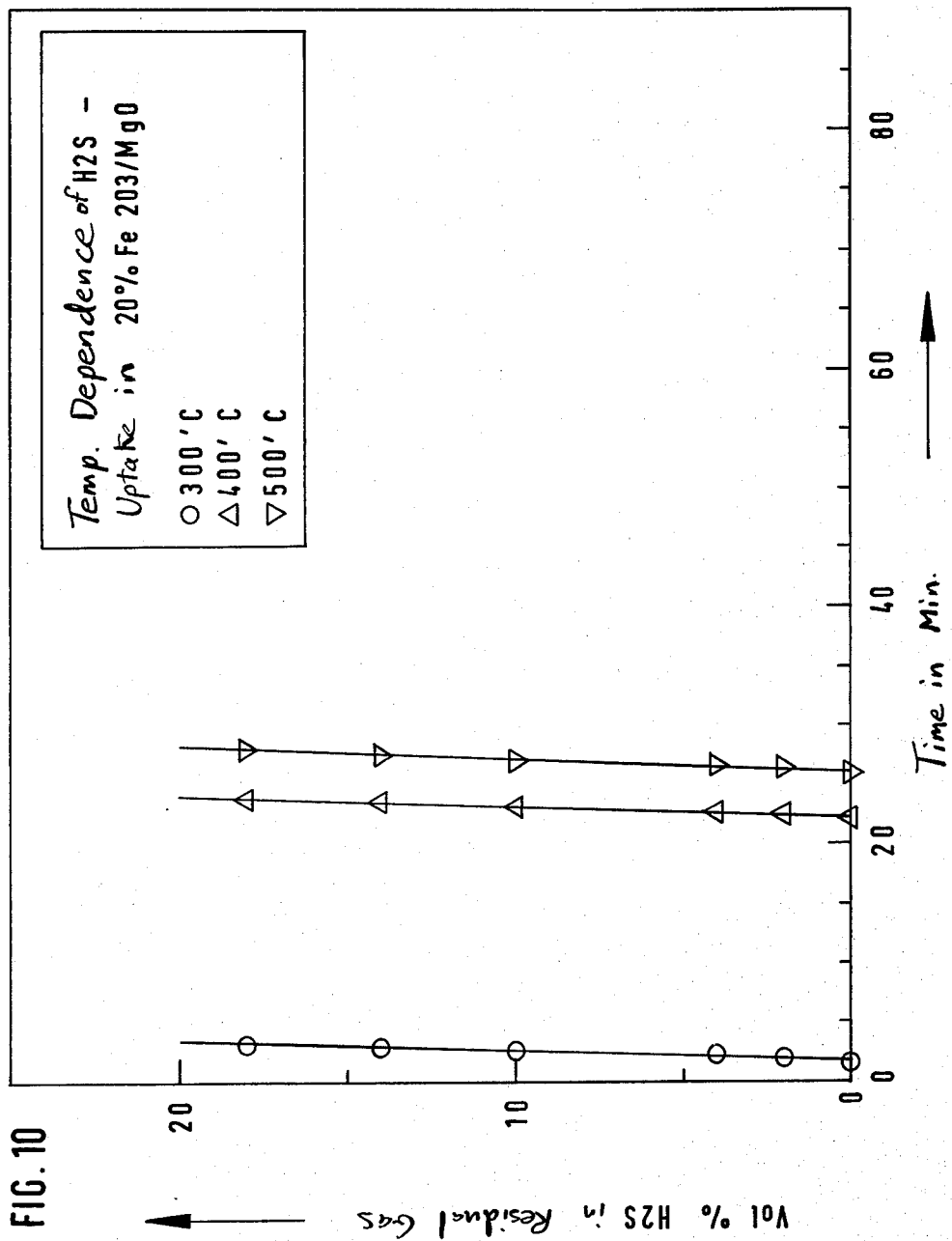
Figure 11:
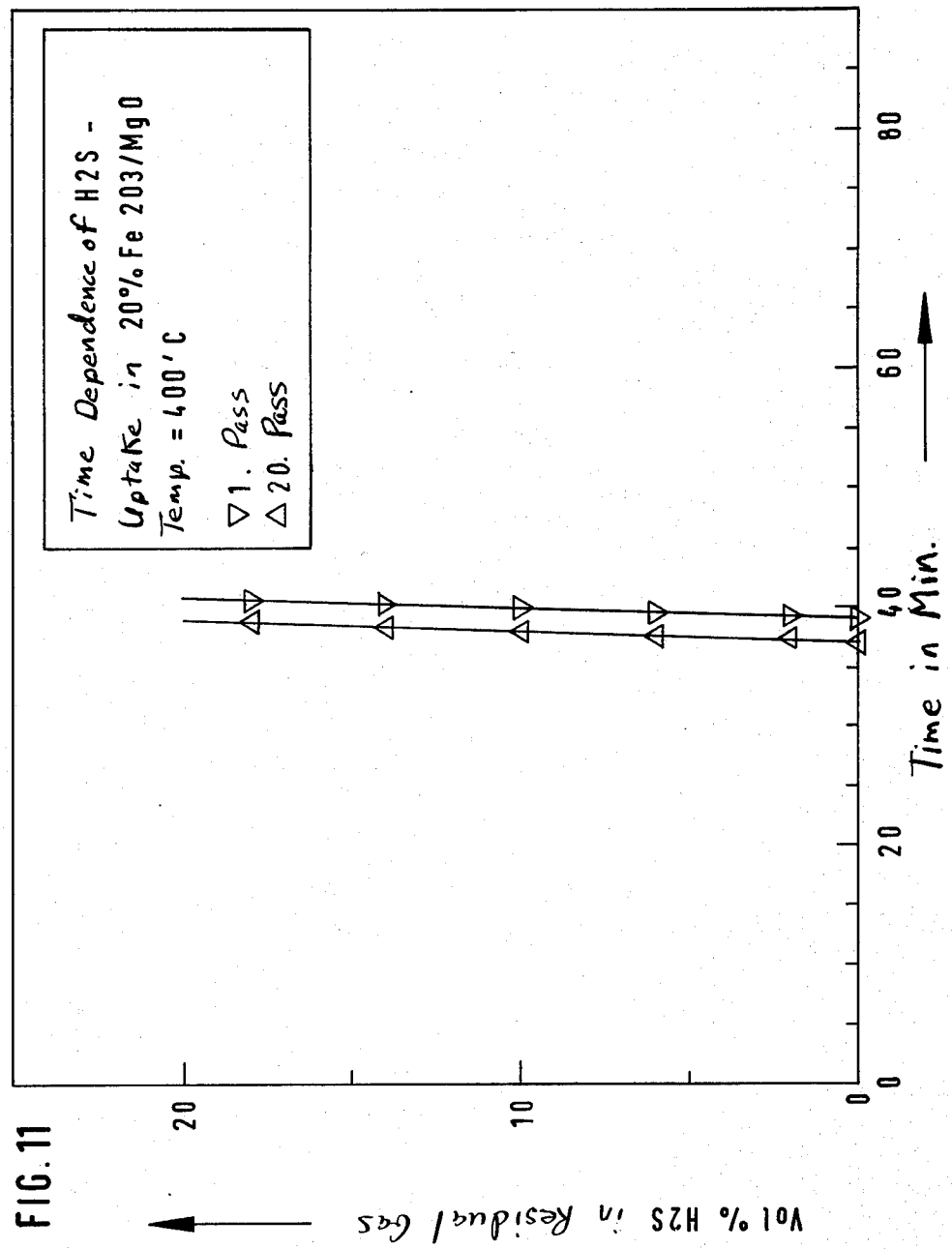

The absorption mass obtained according to Preparation Example I was used. The experimental procedure was as in Example 1 with the use of 2 ml of absorption mass. In FIG. 10, the $H_2S$ concentration in the residual gas is plotted as a function of time. At the sudden increase in $H_2S$ concentration the iron:sulfur ratio was 0.06 at 300° C., 0.25 at 400° C. and 0.29 at 500° C. There was virtually no change in absorption capacity after numerous loading-regenerating cycles, as can be seen from FIG. 11. Regeneration was carried out at 500° C. using a stream of nitrogen containing 1% by volume of oxygen. The sole reaction product was elemental sulfur vapour. The complete regeneration took 90 minutes. At 400° C. complete regeneration took 2 hours.

EXAMPLE 9

This example concerns the dependence of the absorption of $H_2S$ on the hydrogen and carbon monoxide content of the gas stream. An absorption mass of iron on Aerosil (registered trademark) (50% by weight of iron) was prepared according to Method C. 2 ml of this absorption mass were used with the gas flow during the loading of the absorbent and the space velocity being as in preceding examples. Even when the carrier gas was hydrogen containing 1% by volume of $H_2S$, the sulfur:iron ratio was 0.6.

The carbon monoxide content of the gas was also altered. The sulfur:iron ratio was 0.8 when the carbon monoxide was absent. At more than 1% by volume of CO the sulfur:iron ratio fell to 0.6. The capacity remained at a constant value even at a CO content of more than 50% by volume.

EXAMPLE 10

Figure 12:
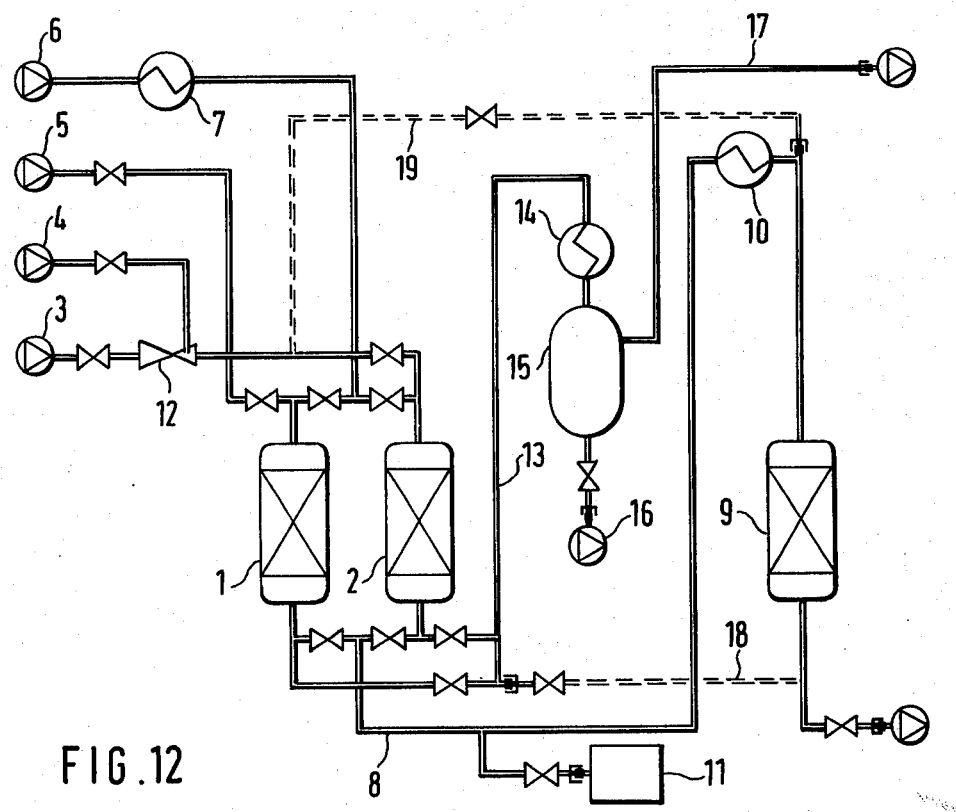

Desulfuration is carried out in a unit as shown diagrammatically in FIG. 12. This unit contains two absorption reactors 1 and 2. They are filled with the absorption mass. The volume of catalyst is 20 $m^3$ in this example and the free gas volume constitutes 60% of the absorption mass. An iron oxide catalyst on alumina and having a weight ratio of 0.7, calculated as metallic iron relative to alumina as support, is used. $10^4$ $m^3$ of a reducing gas stream containing about 2% by volume of $H_2S$ can be passed per hour through such a reactor.

The absorption reactor 1 is first flushed with nitrogen from 5 and then preheated with steam supplied at 3. The $H_2S$-containing crude gas is supplied at 6. It has as a rule a temperature of about 150° C. due to the pretreatment. In the heater 7 it is heated up to a temperature of about 300° C. or above. It is then passed into the reactor 1, the valves being switched in a corresponding manner. The gas leaving the reactor 1 passes via a line 8 into the safety reactor 9, where residual amounts of $H_2S$ which may still be present are removed until the $H_2S$ content at the end of reactor 9 is below 0.1 ppm. If necessary, the gas stream supplied to the reactor 9 is raised to a suitable temperature in the heating/cooling device 10. An $H_2S$ measuring device 11 is connected to the line 8. The prime task of this device is to determine when the absorption mass in the particular operating absorption reactor 1 or 2 is loaded. When this is the case the $H_2S$ content increases sharply. The operation must then be switched to the respective other reactor. This can be effected via automatic-working control units. Depending on the degree of loading of the crude gas with hydrogen sulfide, the temperature and space velocity, it takes in any case a few hours for the absorption mass of an absorption reactor to become loaded with sulfur to an extent which is such that regeneration must be carried out.

After the reactor 1 has been loaded with sulfur, the gas stream 6 is passed into the reactor 2. The absorption mass contained in reactor 1 is then regenerated by passing a mixture of steam supplied at 3 and air supplied at 4 through the reactor 1. The steam/air ratio is of the order of magnitude of 3 to 12 and is so adjusted that the temperature of the absorption mass does not exceed 700° to 800° C. Whilst the absorption is as a rule carried out under a pressure of 0.5 to 15 mPa, the regeneration can be carried out at lower pressures down to atmospheric pressure. This can be industrially exploited by sucking the air from the supply 4 by means of an ejector 12 by the stream of steam. The pressure must of course be sufficiently large to maintain a sufficiently rapid flow through the reactor. The gas mixture leaving the reactor 1 during the regenerating process is passed via the line 13 and the cooler 14, in which the gas mixture is cooled down to about 150° to 200° C. to liquefy the sulfur formed in the regeneration into the closed vessel 15, in which the sulfur is separated from the gas mixture. The liquid sulfur is drawn off via the valve 16. The gas mixture is removed via the line 17 and, depending on the composition and the overall concept of the plant, can be used therein or supplied to a combustion device to combust residual amounts of combustible materials and sulfur which may be present. The sulfur content of the off-gas 17 is extremely low.

When the safety reactor 9 is loaded with sulfur, it must likewise be regenerated or, if a non-regeneratable absorption mass is used here, filled with fresh absorption mass. If a regeneratable absorption mass, as in reactors 1 and 2, is used, gas mixture leaving the reactor 9 during the regenerating process is supplied via the line 18 through correspondingly switched valves to the cooler 14 and the separation vessel 15. The mixture of steam and air used for the regenerating is fed via the line 19 to the safety reactor 9.

EXAMPLE 11

A cylindrical reactor having a diameter of 1 cm was filled with 8 ml, corresponding to 2.09 g, of the absorption mass obtained according to Preparation Example IV. This mass contained 1.045 g of iron oxide. A gas mixture of 79.8% by volume of hydrogen sulfide and 20.2% by volume of nitrogen was passed through this reactor with a space velocity of 53.6 $h^{-1}$. The mass was maintained at 100° C. during the absorption. The hydrogen sulfide content in the off-gas was below 0.1 ppm. It increased sharply after 49 minutes to 79.8% by volume. At this time the sulfur:iron ratio was 0.59.

The absorption mass was regenerated by passing over of a stream of nitrogen containing 5% by volume of oxygen. No sulfur dioxide but only sulfur was formed. The latter was condensed in a cooling vessel. The absorption capacity fell by about a factor of 6. After the absorption mass had been heated up again in a stream of nitrogen to 300° C., the original absorption capacity was again obtained.

It was possible to carry out a large number of absorption-regeneration cycles without the capacity significantly decreasing.

EXAMPLE 12

The procedure of Example 11 was followed, the absorption mass being maintained at 400° C. during the absorption. The hydrogen sulfide content of the off-gas was below 0.1 ppm. It increased sharply to 79.8% by volume after 51 minutes. The iron:sulfur ratio then was 0.62. During this reaction a small amount of elemental sulfur escaped from the absorption mass.

The regeneration was carried out at temperatures of 100° C., 200° C. and 500° C. respectively, the respective oxygen content being 5% by volume, 1% by volume and 0.5% by volume. At 100° C. and 5% by volume of oxygen, no sulfur dioxide was found in the off-gas. At 200° C. the oxygen content had to be below 1% by volume to avoid the formation of sulfur dioxide in the off-gas. At 500° C. the oxygen content had to be below 0.5% by volume to avoid the formation of sulfur dioxide.

After regeneration at 200° C. and 500° C. nitrogen treatment at higher temperatures was not necessary to restore the absorption capacity by removal of elemental sulfur still adhering to the absorption mass. The absorption capacity even increased as the number of absorption-regeneration cycles increased.

EXAMPLE 13

Figure 13:
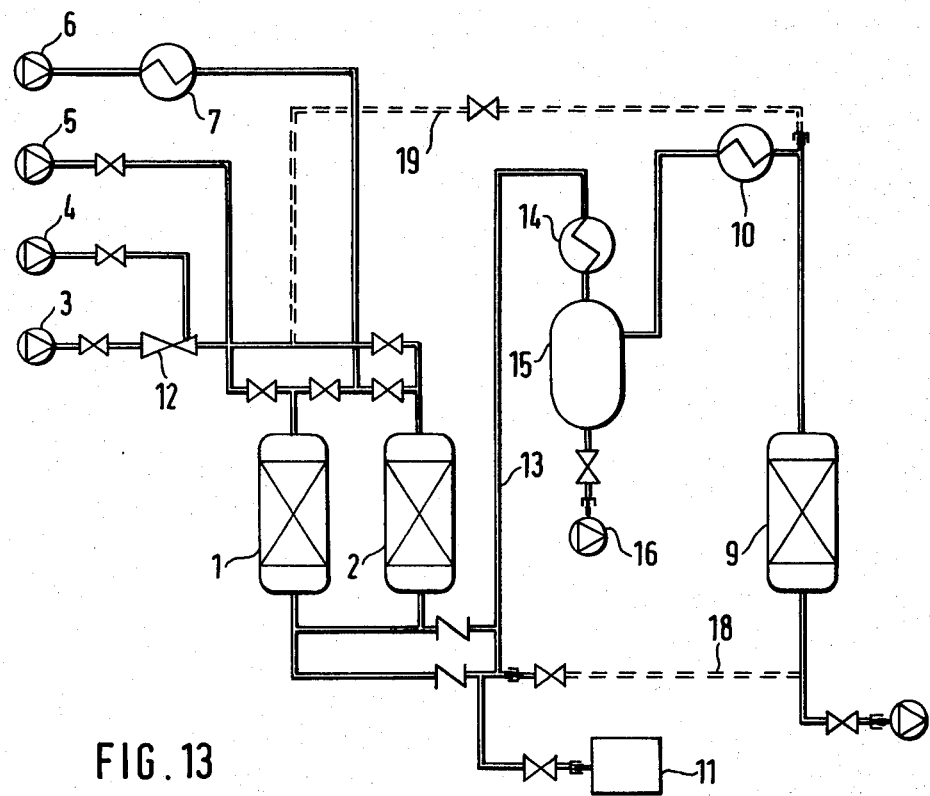

The simultaneous removal of hydrogen sulfide and the isolation of sulfur is carried out in a plant as shown diagrammatically in FIG. 13. In its essential parts it corresponds to the plant in accordance with FIG. 12. Various parts of FIG. 13 which are identical with those in FIG. 12 have been given the same reference numerals as in FIG. 12.

A gas mixture of about 40% by volume of $H_2S$ and about 60% by volume of $CO_2$, and which originated in a physical absorption type gas purification plant, is passed from 6 into the reactor 1. The space velocity is 1,000 m$^3$/hour. Reactor size and absorption mass charge are as in Example 10. The gas to be treated need not be preheated at all or only to a small extent, since the evolution of heat by the absorption reaction is in this case greater than in Example 10. The temperature increase in the absorption stage is so large that the gas leaving the reactor 1 can reach a temperature above 600° C. In this step, at least some of the sulfur, formed simultaneously with the absorption reaction by oxidation according to the following equation, $Fe_2O_3 + H_2S \rightarrow 2FeS + 3H_2O + S$, is vaporised. It is condensed in vessel 15 after the gas mixture has been cooled down in the cooler 14 to 150° to 180° C. The gas leaving the vessel 15 is then passed into the safety reactor 9, if appropriate after heating up in the heater 10. The gas stream leaving the reactor 1 contains only small amounts of $H_2S$, which are monitored by the measuring device 11. After several hours the absorption mass in reactor 1 is loaded with sulfur, mainly in the form of FeS. The $H_2S$ content measured at 11 then increases sharply. The gas stream 6 is then diverted into the reactor 2 by automatic-working units. When the reactor 2 takes over the absorption function the reactor 1 is regenerated by using an oxygen-containing gas supplied from 4 together with steam from 3 and/or nitrogen from 5, as in Example 10. The gas stream leaving the reactor 1 is mixed with the gas stream leaving the reactor 2, so that the sulfur can be isolated in 15. Liquid sulfur can be drawn off at 16. The gas stream leaving the reactors 1 and 2 is passed through special valves which prevent backflow. The exit pressures of the two reactors should be as far as possible identical. The gas leaving the safety reactor 9 is essentially sulfur-free and can be discharged into the atmosphere or, if desired, passed to a combustion device or used in other ways.

The regeneration of the absorption mass contained in the safety reactor 9 can be carried out as in Example 10.

EXAMPLE 14

In this example an absorption mass of iron on Aerosil ($SiO_2$) (registered trademark) was used. The absorption mass was prepared by the Precipitation Method B. Potassium cyanate was used in this method as supplier of the hydroxyl groups (compare Preparation Example IV). The precipitation temperature was 45° C.

2 ml of this absorption mass were used with the gas flow on loading of the absorbent and the space velocity being as in preceding examples.

The entry gas contained 25% by volume of hydrogen, 10% by volume of carbon monoxide and 1% by volume of hydrogen sulfide, the remainder being nitrogen.

The absorption mass was investigated at 300°, 350°, 400°, 450° and 500° C.

The total amount of sulfur absorbed until breakthrough was the same at each temperature, within the customary experimental error limits. The sulfur:iron ratio at breakthrough was 0.9. Regeneration was carried out as described in Example 3. Regeneration was carried out with care and solely elemental sulfur was obtained.

EXAMPLE 15

This example illustrates the activity of sulfur removal at room temperature using an $Fe_2O_3/SiO_2$ mass.

1.15 g of $Fe_2O_3/SiO_2$ catalyst, prepared according to Preparation Example III and containing 0.52 g of $Fe_2O_3$, was introduced into a small test reactor. A mixture of 0.78% by volume of $H_2S$ and a nitrogen remainder was passed through the catalyst bed at room temperature. The content of $H_2S$ in the gas leaving the reactor was measured at intervals.

After 94 minutes the $H_2S$ amount in the purified gas was below 10 ppm (in this experiment the exact amount was not determined within the range of 0 to 10 ppm). Breakthrough began after 94 minutes. The total amount of $H_2S$ obsorbed was equivalent to a sulfur-iron ratio (atomic ratio) of 0.47. The sulfur-iron ratio was 0.2 at the $H_2S$ breakthrough.

I claim:
1. A process for removal of hydrogen sulfide, carbonyl sulfide and/or carbon disulfide from gases, comprising:
   (a) passing the gas containing hydrogen sulfide, carbonyl sulfide or carbon disulfide, at a temperature of from 5° to 800° C. over an absorption mass including metal oxides which react with the sulfur compound to give metal-sulfur compounds and which metal oxides are present on an inert, refractory support having a specific surface area of more than 10 m$^2$ per g,
   (b) said support being loaded with the metal oxide in an amount of at least 5% by weight, calculated as metal of the active component and relative to the weight of the support,
   (c) at least 20% by weight of the metal oxides on the support being in finely divided form with a particle size of less than 40 nanometers, and

(d) regenerating the support loaded with metal-sulfur compounds by oxidizing said metal-sulfur compounds by passing over of gases including oxidizing agents.

2. Process according to claim 1, characterized in that the gases are reducing gases.

3. Process according to claim 2, characterized in that coal gas is used as the reducing gas.

4. Process according to claim 3, characterised in that the coal gas, as a dry gas, contains the following components:

25–50% of $H_2$
18–70% of CO
2–30% of $CO_2$
0–15% of $CH_4$
0.01–5% of $H_2S$
<–2% of COS, $CS_2$, HCl, $NH_3$ and other components.

5. Process according to claim 1, characterised in that the gases are natural gases.

6. Process according to claim 1, characterised in that the support is loaded with the metal oxide in an amount of at least 20% by weight, calculated as metal of the active component and relative to the weight of the support.

7. Process according to claim 1, characterised in that the absorption of the sulfur compounds is carried out at temperatures of 200° to 800° C.

8. Process according to claim 1, characterised in that the metal oxide is iron oxide.

9. Process according to claim 1, characterised in that at least 50% by weight of the metal oxides on the support are present with a particle size of less than 40 nm.

10. Process according to claim 1, characterised in that regeneration is carried out at temperatures of 20° to 700° C. and sulfur, if present, is driven off at temperatures above about 200° C.

11. Process according to claim 1, characterised in that regeneration is carried out at temperatures of 200° to 700° C.

12. Process according to claim 1, characterised in that the gas used for regeneration contains less than 5% by volume of oxygen.

13. Process according to claim 1, characterised in that the gases containing sulfur compounds contain oxygen in an amount which is such that the atomic ratio of oxygen to sulfur does not exceed 1.

14. Process according to claim 1, wherein the gas passed over the absorption mass contains $H_2S$.

15. Process according to claim 1, wherein the gas passed over the absorption mass contains COS.

16. Process according to claim 1, wherein the gas passed over the absorption mass contains $CS_2$.

17. A process for removal of mercaptans and/or thiophene from gases, comprising:
(a) passing the gas containing mercaptan or thiophene at a temperature of from 5° to 800° C. over an absorption mass including metal oxides which react with the sulfur compound to give metal-sulfur compounds and which metal oxides are present on an inert, refractory support having a specific surface area of more than 10 $m^2$ per g,
(b) said support being loaded with the metal oxide in an amount of at least 5% by weight, calculated as metal of the active component and relative to the weight of the support,
(c) at least 20% by weight of the metal oxides on the support being in finely divided form with a particle size of less than 40 nanometers, and
(d) regenerating the support loaded with metal-sulfur compounds by oxidizing said metal-sulfur compounds by passing over of gases including oxidizing agents.

18. Process according to claim 6, wherein the support is loaded with the metal oxide in an amount of at least 40% by weight calculated as metal of the active component and relative to the weight of the support.

19. Process according to claim 7, wherein the absorption of the sulfur compounds is carried out at temperatures of 300° to 600° C.

20. Process according to claim 9, wherein at least 50% by weight of the metal oxides on the support are present with a particle size of less than 20 nanometers.

* * * * *